United States Patent
Chan et al.

(10) Patent No.: US 10,824,999 B2
(45) Date of Patent: *Nov. 3, 2020

(54) SYSTEMS AND METHODS FOR IMPLEMENTING HYBRID PUBLIC-PRIVATE BLOCK-CHAIN LEDGERS

(71) Applicant: The Toronto-Dominion Bank, Toronto (CA)

(72) Inventors: Paul Mon-Wah Chan, Toronto (CA); John Jong Suk Lee, Toronto (CA); Perry Aaron Jones Haldenby, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,509

(22) Filed: Mar. 14, 2019

(65) Prior Publication Data

US 2019/0213564 A1    Jul. 11, 2019

Related U.S. Application Data

(63) Continuation of application No. 15/234,947, filed on Aug. 11, 2016, now Pat. No. 10,282,711.
(Continued)

(51) Int. Cl.
*G06F 11/30*       (2006.01)
*G06Q 20/06*       (2012.01)
(Continued)

(52) U.S. Cl.
CPC ......... *G06Q 20/0655* (2013.01); *G06F 21/62* (2013.01); *G06F 21/645* (2013.01);
(Continued)

(58) Field of Classification Search
CPC ... G06F 21/645; H04L 9/0816; H04L 9/0861; H04L 9/0891; H04L 9/0894;
(Continued)

(56) References Cited

U.S. PATENT DOCUMENTS 7,194,543 B2    3/2007    Corneille et al.
7,324,976 B2    1/2008    Gupta et al.
(Continued)

FOREIGN PATENT DOCUMENTS

EP          1693804 A2       8/2006
WO     2013/112642 A2       8/2013

OTHER PUBLICATIONS

"Open-source Internet of Things Micropayment Processing Hits the Market," Bitcointalk.org, Jul. 2015 (retrieved from https://bitcointalk.org/index.php?topic=854280;imode on Sep. 30, 2016), 3 pages.
(Continued)

*Primary Examiner* — Samson B Lemma
(74) *Attorney, Agent, or Firm* — Duane Morris LLP

(57) ABSTRACT

The disclosed embodiments include computerized systems and methods that generate secured distributed storage ledger structures, such as block-chain-based ledger structures, that facilitate event-based control of tracked assets. In one embodiment, an apparatus associated with a centralized authority of the secured distributed storage ledger may detect an occurrence of a triggering event, and may access and decrypt a set of rules hashed into the secured distributed storage ledger using a confidentially-held master cryptographic key. The apparatus may identify a rule associated with the detected event, and perform one or more operations consistent with the rule and involving at least one of assets tracked within the secured distributed storage ledger or an owner of a portion of the tracked assets.

20 Claims, 6 Drawing Sheets

Related U.S. Application Data

(60) Provisional application No. 62/204,768, filed on Aug. 13, 2015.

(51) Int. Cl.

| | | |
|---|---|---|
| *G06F 21/64* | (2013.01) | |
| *H04N 5/913* | (2006.01) | |
| *G06Q 20/36* | (2012.01) | |
| *G06Q 10/06* | (2012.01) | |
| *G06Q 10/10* | (2012.01) | |
| *G06Q 50/08* | (2012.01) | |
| *G06Q 20/10* | (2012.01) | |
| *G06Q 20/40* | (2012.01) | |
| *G06F 21/62* | (2013.01) | |
| *H04L 9/08* | (2006.01) | |
| *G06Q 50/18* | (2012.01) | |
| *H04L 9/32* | (2006.01) | |
| *H04L 29/06* | (2006.01) | |
| *G06Q 10/08* | (2012.01) | |
| *G06Q 30/02* | (2012.01) | |
| *G06Q 40/00* | (2012.01) | |
| *G06Q 40/08* | (2012.01) | |
| *G06Q 20/38* | (2012.01) | |

(52) U.S. Cl.
CPC . *G06Q 10/0631* (2013.01); *G06Q 10/063114* (2013.01); *G06Q 10/08* (2013.01); *G06Q 10/103* (2013.01); *G06Q 10/1097* (2013.01); *G06Q 20/065* (2013.01); *G06Q 20/102* (2013.01); *G06Q 20/367* (2013.01); *G06Q 20/3829* (2013.01); *G06Q 20/401* (2013.01); *G06Q 20/405* (2013.01); *G06Q 20/4016* (2013.01); *G06Q 30/0214* (2013.01); *G06Q 40/08* (2013.01); *G06Q 40/128* (2013.12); *G06Q 50/08* (2013.01); *G06Q 50/18* (2013.01); *H04L 9/0816* (2013.01); *H04L 9/0861* (2013.01); *H04L 9/0891* (2013.01); *H04L 9/0894* (2013.01); *H04L 9/3247* (2013.01); *H04L 63/061* (2013.01); *H04L 63/062* (2013.01); *H04L 63/0876* (2013.01); *H04N 5/913* (2013.01); *G06Q 2220/00* (2013.01); *G06Q 2220/10* (2013.01); *G06Q 2230/00* (2013.01); *H04L 63/0435* (2013.01); *H04L 63/0442* (2013.01); *H04L 63/08* (2013.01); *H04L 63/12* (2013.01); *H04L 2209/24* (2013.01); *H04L 2209/38* (2013.01); *H04L 2209/56* (2013.01); *H04N 2005/91342* (2013.01); *Y02P 90/86* (2015.11); *Y04S 10/54* (2013.01)

(58) Field of Classification Search
CPC .............. H04L 9/3247; H04L 2209/38; H04L 2209/56; H04L 63/0435; H04L 63/0442; H04L 63/061; H04L 63/062; H04L 63/08; H04L 63/0876; H04L 63/12
USPC .................................................. 713/193, 171
See application file for complete search history.

(56) References Cited

U.S. PATENT DOCUMENTS

| | | | |
|---|---|---|---|
| 8,150,769 | B2 | 4/2012 | Gupta et al. |
| 2002/0111907 | A1 | 8/2002 | Ling |
| 2002/0128917 | A1 | 9/2002 | Grounds |
| 2003/0126079 | A1 | 7/2003 | Roberson et al. |
| 2005/0024201 | A1 | 2/2005 | Culpepper et al. |
| 2005/0091173 | A1* | 4/2005 | Alve ............... G06F 21/10 705/71 |
| 2006/0242038 | A1 | 10/2006 | Guidilli |
| 2014/0005809 | A1* | 1/2014 | Frei ............... G08B 25/01 700/90 |
| 2015/0371548 | A1 | 12/2015 | Samid |
| 2016/0066540 | A1 | 3/2016 | Androulaki et al. |
| 2016/0162897 | A1 | 6/2016 | Feeney |
| 2016/0292680 | A1* | 10/2016 | Wilson, Jr. ......... G06Q 20/3678 |
| 2016/0342989 | A1 | 11/2016 | Davis |
| 2017/0046689 | A1* | 2/2017 | Lohe ................. G06Q 20/3823 |
| 2017/0177898 | A1* | 6/2017 | Dillenberger ......... H04L 9/3236 |

OTHER PUBLICATIONS

"How It Works," (retrieved from http://toronto.car2go.com/how-it-works/ on Sep. 30, 2016,) 8 pages.

Karame, G.O., et al., "Pay as you Browse: Microcomputations as Micropayments in Web-based Services," Proceedings of WWW 2011—Session: E-commerce, Mar. 28-Apr. 1, 2011, pp. 307-316.

Ectors, M., "Five new businesses for Telefonica Digital," Sep. 21, 2011 (retrieved from http://telruptive.com/tag/micro-payment on Sep. 30, 2016, 1 page.

Dawson, R., "The new layer of the economy enabled by M2M payments in the Internet of Things," Sep. 16, 2014, retrieved from http://rossdawsonblog.com/weblog/archives/2014/09/new-layer-economy-enabled-m2m-payments-internet-things.html on Sep. 30, 2016), 7 pages.

* cited by examiner

SYSTEMS AND METHODS FOR IMPLEMENTING HYBRID PUBLIC-PRIVATE BLOCK-CHAIN LEDGERS

CROSS-REFERENCE TO RELATED APPLICATION

This application is a continuation of and claims the benefit of priority to U.S. application Ser. No. 15/234,947, filed Aug. 11, 2016, which claims the benefit of priority to U.S. Provisional Application No. 62/204,768, filed Aug. 13, 2015. The disclosures of these application are incorporated herein by reference to their entireties.

TECHNICAL FIELD

The disclosed embodiments generally relate to computerized systems and methods for securing data, and more particularly, and without limitation, computerized systems and methods that generate secured block-chain-based ledger structures that facilitate event-based control of tracked assets.

BACKGROUND

A block-chain is a distributed database incorporating a number of blocks where each block contains data and/or programs and holds a valid "transaction" that is time-stamped. As used herein, a "transaction" is typically a discrete operation that makes up, or is a part of, an information processing action. Each block in a block-chain also includes a link to a previous block in the block-chain thus creating a public distributed storage ledger, i.e., a log or an historical record, of transactions. A robust distributed storage ledger structure (such as a block-chain ledger structure) due to its public nature, redundant verification, and resistance to fraudulent activity, offers advantages over existing centralized server systems. Despite its many advantages, conventional distributed storage ledger systems (such as block-chain-based ledger systems) exhibit significant flaws, especially when used to track assets in secure, high-risk, and/or sensitive applications.

SUMMARY

The disclosed embodiments relate to computerized systems and methods that generate secured distributed storage ledger structures, such as block-chain-based ledger structures, that facilitate event-based control of tracked assets.

In one embodiment, an apparatus includes a storage device and at least one processor coupled to the storage device. The storage device may store software instructions for controlling the at least one processor when executed by the at least one processor, and the at least one processor being operative with the software instructions and configured to detect an occurrence of an event. The at least one processor may be further configured to determine that the detected event corresponds to at least one triggering event, and in response to the determination, obtain data identifying one or more rules. The one or more rules may be associated with a centralized authority. The at least one processor may be further configured to identify, based on the obtained rules data, at least one of the one or more rules that exhibits a causal relationship with the detected event, and perform one or more operations consistent with the at least one identified rule.

In further embodiments, a computer-implemented method may include detecting, using at least one processor, an occurrence of an event. The method may also include determining, using the at least one processor, that the detected event corresponds to at least one triggering event and in response to the determination, obtaining, using at the least one processor, data identifying one or more rules. The one or more rules may be associated with a centralized authority. Based on the obtained rules data, the method may include identifying, using the at least one processor, at least one of the one or more rules that exhibits a causal relationship with the detected event, and performing, using the at least one processor, one or more operations consistent with the at least one identified rule.

Additionally, the disclosed embodiments may include a tangible, non-transitory computer-readable medium storing instructions that, when executed by at least one processor, perform a method that includes detecting an occurrence of an event. The method may also include determining that the detected event corresponds to at least one triggering event and in response to the determination, obtaining data identifying one or more rules. The one or more rules may be associated with a centralized authority. Based on the decrypted rules data, the method may include identifying at least one rule that exhibits a causal relationship with the detected event, and performing one or more operations consistent with the at least one identified rule.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims

DETAILED DESCRIPTION

Figure 1:
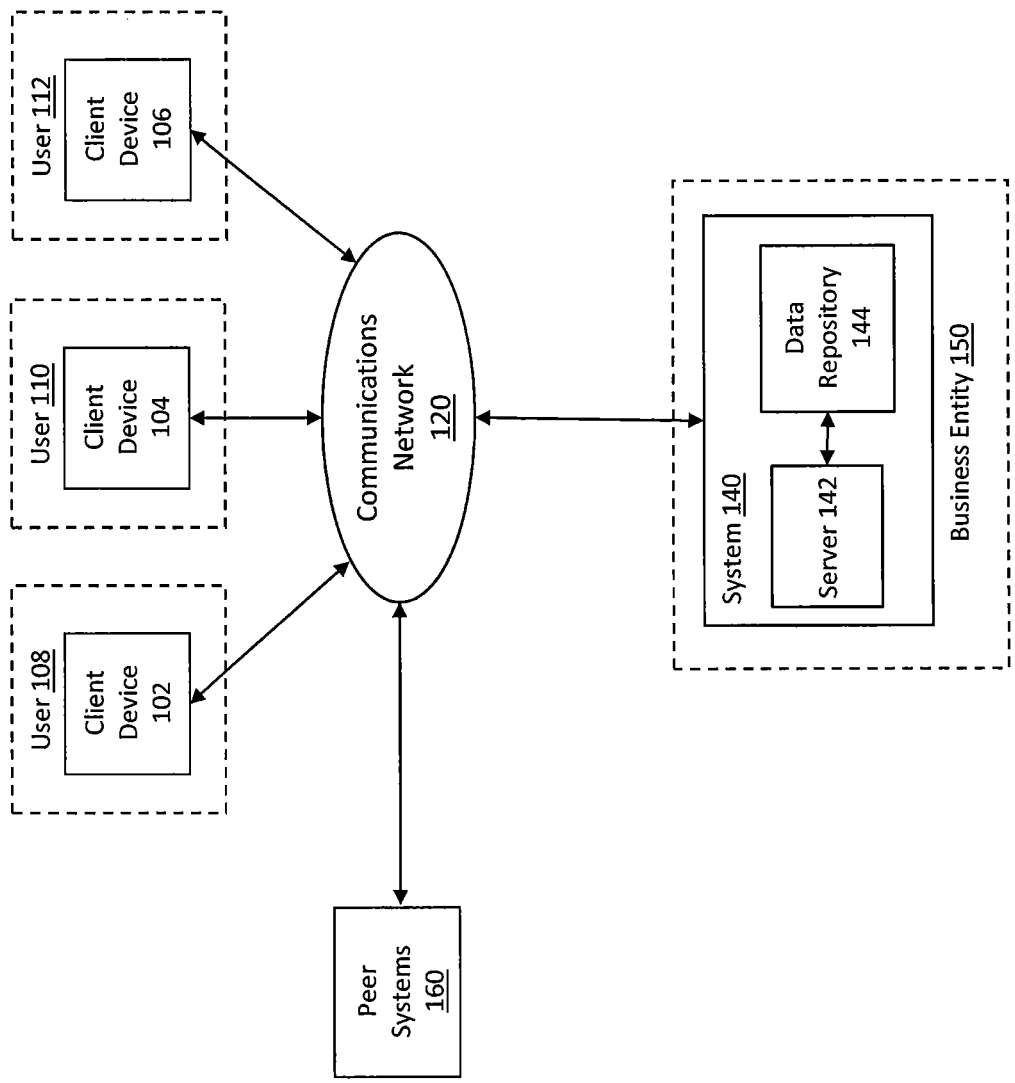
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

I. Exemplary Computing Environments, Networks, Systems, and Devices

FIG. 1 illustrates an exemplary computing environment 100 consistent with certain disclosed embodiments. In one aspect, computing environment 100 may include client devices 102, 104, and 106, system 140, peer systems 160, and a communications network 120 connecting one or more of the components of environment 100.

Consistent with the disclosed embodiments, one or more of the components of computing environment 100 may be configured to address problems inherent to conventional block-chain-based ledgers by embedding a private-master encryption key architecture into a conventional block-chain architecture (e.g., a block-chain-based architecture associated with the public Bitcoin™ ledger). In some aspects, the resulting hybrid block-chain architecture may facilitate a selective encryption of information by client devices 102, 104, and 106, system 140, and/or peer systems 160, thus providing a technical solution that protects sensitive and/or confidential instructions sets and event triggers and corresponding confidential instructions sets.

a. Exemplary Client Devices

In one embodiment, client devices 102, 104, and/or 106 may include a computing device, such as, but not limited to, a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, at least one of client devices 102, 104, and/or 106 may be associated with one or more users, such as users 108, 110, and/or 112. For instance, user 110 may operate client device 104 and may do so to cause client device 104 to perform one or more operations consistent with the disclosed embodiments.

Client devices 102, 104, and/or 106 may include one or more tangible, non-transitory memories that store data and/or software instructions, and one or more processors configured to execute software instructions. Client devices 102, 104, and/or 106 may include one or more display devices that display information to a user and one or more input device(s) to allow the user to input information to client device 102, 104, and/or 106 (e.g., keypad, keyboard, touchscreen, voice activated control technologies, or any other type of known input device).

In one aspect, client devices 102, 104, and/or 106 may store in memory one or more software applications that run on client device 104 and are executed by the one or more processors. In some instances, client device 104 may store software applications that, when executed by one or more processors, perform operations that establish communications with one or more of peer systems 160 (e.g., across network 120) and that obtain, from peer systems 160, a current version of a hybrid block-chain ledger generated and maintained in accordance with the disclosed embodiments.

In other instances, and as described below, one or more of client devices 102, 104, and/or 106 may execute the one or more stored software application and to obtain data from the hybrid block-chain ledger that includes, but not limited to, data identifying one or more tracked assets, and/or a public key of one or more users. Further, and as described below, the one or more executed software applications may cause client devices 102, 104, and/or 106 to extract, from the one or more accessed blocks, a copy of an encrypted and/or hashed ownership/rules portion of the transaction block (e.g., including the identification a holder of a master key) and/or a copy of an encrypted and/or hashed master data block (e.g., encrypted using the master key and including rules permitting preconfigured and/or actions involving the tracked assets). In additional instances, and as further described below, client devices 102, 104, and/or 106 may provide information associated with one or more actions or transactions involving the tracked assets (e.g., information identifying the actions or transaction, information identifying the assets, a public key, a digital signature, etc.) to peer systems 160, along with copies of the encrypted and/or hashed rules engines and lists of triggering events.

In some aspects, the one or more stored applications may include a wallet application provided by business entity 150 (e.g., a mobile wallet application or an application executable on a desktop computer) and capable of initiating transactions denominated in one or more currencies, including virtual currencies such as Bitcoin™.

b. Exemplary Computer Systems

System 140 may be a computing system configured to execute software instructions to perform one or more operations consistent with disclosed embodiments. In one aspect, system 140 may be associated with a business entity 150 (e.g., a financial institution) that provides financial accounts, financial services transactions, and investment services one or more users (e.g., customers of the business entity 150). In some aspects, system 140 may be a distributed system that may include computing components distributed across one or more networks, such as network 120, or other networks.

In one aspect, system 140 may include computing components configured to store, maintain, and generate data and software instructions. For example, system 140 may include one or more servers (e.g., server 142) and tangible, non-transitory memory devices (e.g., data repository 144). Server 142 may include one or more computing devices that may be configured to execute software instructions to perform one or more processes consistent with the disclosed embodiments. In one example, server 142 may be a computing device that executes software instructions that perform operations that provides information to one or more other components of computing environment 100.

In one embodiment, server 142 may include a computer (e.g., a personal computer, network computer, or mainframe computer) having one or more processors that may be selectively activated or reconfigured by a computer program. In one aspect, server 142 (or other computing components of system 140) may be configured to provide one or more websites, digital portals, etc., that provide services consistent with business entity 150, such as a digital banking or investment portal, and services consistent with disclosed embodiments. For instance, server 142 may be configured to provide information associated with a requested web page over communications network 120 to client device 104, which may render the received information and present content from the web page on a display device, e.g., a touchscreen display unit.

In other aspects, server 142 (or other computing components of system 140) may be configured to provide information to one or more application programs executed by client device 104 (e.g., through a corresponding application programming interface (API)). For example, client device 104 may execute an application program associated with and provided by business entity 150, such a mobile banking application and/or a mobile wallet application, to provide services consistent with the disclosed embodiments. In some instances, server 142 may provide information to client devices 102, 104, and/or 106 (e.g., through the API associated with the executed application program), and client devices 102, 104, and/or 106 may be configured by the executed application program to present portions of the information to corresponding users through a corresponding graphical user interface (GUI).

In further aspects, server 142 (or other computing components of system 140) may be configured to provide to client devices 102, 104, and/or 106 (and/or receive from client device 104) information associated with services provided by business entity 150. For example, client device 104 may receive the transmitted information, and store portions of the information in locally accessible storage device and/or network-accessible storage devices and data repositories (e.g., cloud-based storage). In one instance, client device 104 may execute stored instructions (e.g., an application program, a web browser, a mobile banking application, and/or a mobile wallet application) to process portions of the stored data and render portions of the stored data for presentation to user 110. Additionally, server 142 may be incorporated as a corresponding node in a distributed network, and additionally or alternatively, as a corresponding networked server in a cloud-computing environment. Furthermore, server 142 may communicate via network 120 with one or more additional servers (not shown), which may facilitate the distribution of processes for parallel execution by the additional servers.

In further aspects, business entity 150 may represent a "controlling entity" capable of regulating transactions assets (e.g., units of virtual currency, units of various financial instruments, physical assets, etc.) tracked within hybrid public-private ledgers consistent with the disclosed embodiments. By way of example, one or more computing components of system 140 (e.g., server 142) may be configured (e.g., by executed software instructions) to establish one or more rules that regulate a distributions of and/or transactions associated with the tracked assets, an initiation of transfers of the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.).

Additionally, in some aspects, system 140 may establish causal relationships between one or more of the established rules and one or more events that trigger an initiation of one or more corresponding regulated distributions, transfers, and/or other actions involving assets tracked within the hybrid public-private ledger (e.g., "triggering events"). For example, a confirmed loss of a private cryptographic key issued to user 110 may represent a triggering event that causes system 140 to verify user 110's identity, initiate a transaction of the orphaned assets, generate a new pair of public and private cryptographic keys for user 110 (i.e., public and private block-chain keys), and transmit at least the private block-chain key to user 110 through secure, non-accessible processes, in accordance with one or more of the established rules.

Further, by way of example, a theft of a portion of user 110's tracked assets (e.g., units of virtual currency specified within one of more blocks of the hybrid public-private ledger) may represent a triggering event that causes system 140 to initiate a recovery protocol to generate a transaction request to recover the value of the stolen assets (e.g., to transfer the stolen assets back to user 110), and further, to generate a new pair of public and private block-chain keys for user 110, as described above. In other instances, a death and/or incapacitation of user 110 may represent a triggering event that causes system 140 to initiate a series of transaction to distribute of at least a portion of the tracked assets (e.g., through corresponding transaction requests consistent with the disclosed embodiments) to one or more additional owners identified by user 110 and specified within corresponding ones of the identified rules.

In some aspects, system 140 may be configured to establish one or more of the rules, and further, one or more of the causal relationships and triggering events, based on internal regulations associated with business entity 150. For example, the one or more internal regulations associated with business entity 150 may specify that system 140 verify an identity of user 110 (e.g., based on various forms of multi-factor authentication data) and/or obtain specific elements of documentation (e.g., a police report, etc.) prior to initiating the lost private key protocol and/or the recovery protocols outlined above. In other aspects, system 140 may one or more of the rules and/or triggering events based on information received from user 110 (e.g., as input provided to a web page or other graphical user interface (GUI) presented by client device 104 and provided to system 140). For example, user 110 may specify, as input to the web page or GUI presented by client device 104, one or more individuals that would receive portions of the tracked assets upon completion of one or more tasks and/or in the event of user 110's accidental death. The disclosed embodiments are, however, not limited to the exemplary triggering events and established rules described above, and in further aspects, the disclosed embodiments may be configured to generate any additional or alternate user- and system-specified rules and triggering events consistent with the hybrid public-private ledger and appropriate to the tracked assets, user 110, and/or business entity 150 (i.e., acting as a centralized authority for the hybrid public-private ledger).

Further, and as outlined below, system 140 may be configured to store the one or more established rules (e.g., as a rules engine) and one or more of the established trigger events (e.g., as an event trigger list) within a portion of a local data repository (e.g., data repository 144). Additionally or alternatively, system 140 may be configured to store portions of the rules engine and/or event trigger list within a secure data repository accessible to system 140 across network 140 (e.g., cloud-based storage).

As described above, one or more computing components of system 140 (e.g., server 142) may be configured to generate pairs of public and private block-chain keys for user 110 (e.g., user 110's public/private block-chain key pair), and to provide the generated private block-chain key to user 110 through secure, non-accessible and/or out-of-band communications (e.g., by mail, etc.). In further embodiments, the one or more components of system 140 (e.g., server 142) may be configured to generate and maintain additional cryptographic keys that facilitate a generation and maintenance of portions of the hybrid public-private ledger. For instance, system 140 may be configured to generate a master key, which system 140 may leverage to encrypt the stored rules engine. In certain aspects, system 140 may store copies of the generated master key in a portion of data repository 144 that is not accessible to user 110 (and any other users), thus maintaining a confidence of the generated master key.

In additional aspects, system 140 may be configured to generate and maintain a private crypto key on behalf of user 110 (and additionally or alternatively, user 108 and 112), which system 140 may leverage to encrypt the stored event trigger list, and which may be provided to user 110 (and/or to user 108 and 112) through secure, non-accessible and/or out-of-band communications. Further, and as described above, system 140 may store copies of the private crypto keys in a portion of data repository 144.

Further, in additional embodiments, one or more computing components of system 140 (e.g., server 140) may be configured to hash the generated (and encrypted) rules engine and event trigger list into a genesis block associated with the hybrid public-private ledger. In other aspects, system 140 may provide the encrypted rules engine and event triggers list to one or more of peer system 160, which may be configured to hash the encrypted rules engine and event trigger list into the genesis block. By way of example, and by hashing the encrypted rules engine and event trigger list into the genesis block of the hybrid public-private ledger, the disclosed embodiments enable an in-band communication of the encrypted rules engine and event triggers from user to user within blocks (e.g., transactions) of the hybrid public-private ledger c. Exemplary Data Repositories and Stored Data Data repository 144 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments. Data repository 144 may also be configured to store information relating to business entity 150, e.g., a financial institution.

For instance, data repository 144 may store customer data that uniquely identifies customers of a financial institution associated with system 140. By way of example, a customer of the financial institution (e.g., users 108, 110, and/or 112) may access a web page associated with system 140 (e.g., through a web server executed by a corresponding front end), and may register for digital banking services and provide data, which may be linked to corresponding ones of users 108, 110, and/or 112, and stored as customer data within data repository 144. The stored customer data may, for example, include personal information, government-issued identifiers, employment information, and contact information. The stored customer data may also include authentication credentials associated with registered users of the financial institution (e.g., a user name, a user-specified password, a system-generated password, an alphanumeric identification number (e.g., a PIN number) specified by the users or assigned by financial system 140, biometric information, and information facilitating enhanced authentication techniques).

In additional aspects, and as described above, data repository 144 may store a rules engine identifying or more rules that regulate a distribution of the tracked assets, an initiation of one or more transactions involving the tracked assets (e.g., a sale, a transfer in ownership, a use of the tracked assets as collateral in a secured transaction etc.), and further, any additional or alternate action involving the tracked assets and/or the hybrid public-private ledger (e.g., processes that generate additional cryptographic key sets for users 108, 110, and/or 112, processes that recover assets racked in the hybrid public-private ledger, etc.). Further, and as described above, data repository 144 may also store information identifying an event triggers list that identifies causal relationships established by system 140 between one or more of the established rules and one or more events that trigger an initiation of one or more corresponding regulated distributions, transactions, and/or assets tracked within the hybrid block-chain ledger (e.g., "triggering events").

In some aspects, system 140 may be configured to establish one or more of the rules, and further, one or more of the causal relationships and triggering events, based on one or more internal regulations associated with business entity 150. In other aspects, system 140 may one or more of the rules and/or triggering events based on information received from one or more of users 108, 110, and/or 112 (e.g., as input provided to a web page or other graphical user interface (GUI) presented by client devices 102, 104, and/or 106 and provided to system 140).

In an embodiment, data repository 144 may also store a copy of a master key and private crypto keys associated with users 108, 110, and 112 (and additionally or alternatively, additional private crypto keys associated with other users). By way of example, system 140 may be configured to store the private crypto keys in a data structure that includes information that associates the private crypto keys with corresponding ones of user 108, 110, and 112, and further, may be configured to store the master key in a data structure within data repository 144 that is inaccessible to users 108, 110, and/or 112 (and additionally or alternatively, to other users). Further, in some aspects, data repository 144 may be configured to store the rules engine and/or event triggers list in raw, unencrypted form. In other aspects, consistent with the disclosed embodiments, data repository 144 may be configured to store the rules engine and/or event triggers in encrypted form (e.g., using the stored master key), and/or store a hashed representation of the rules engine and/or the event triggers list.

d. Exemplary Communications Networks

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

e. Exemplary Peer Systems

Referring back to FIG. 1, peer systems 160 may include one or more computing systems configured to execute software instructions to perform one or more operations consistent with disclosed embodiments. In some aspects, peer systems 160 may include computing components configured to store, maintain, and generate data and software instructions. For example, each of peer systems 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer system 160 may be configured to receive, from client device 104 across network 120, information associated with a distribution of, transaction involving, or other action associated with one or more assets tracked within hybrid block-chain ledgers consistent with the disclosed embodiments. By way of example, the received information may include, but is not limited to, data identifying at least a portion of the tracked assets, data identifying a current owner of the portion of the tracked assets (e.g., user 110) (or a obfuscated owner identifier), and further, encrypted copies of and/or hash values representative of the rules engine and event triggers list.

In some aspects, the one or more of peer systems 160 may be configured (e.g., by the executed software programs) to validate the received information and to generate a new block of the hybrid block-chain ledger that includes the received information, either alone (e.g., using a "one transaction, one block" paradigm) or in combination with information identifying additional distributions, transactions, or other actions associated with one or more tracked assets (e.g., as a multiple-transaction block). The one or more of peer systems 160 may be further configured to generate one or more hashes representative of the new block, which may be appended to a prior version of the hybrid private-public ledger along with the newly generated block. In some aspects, the one or more of peer system 160 may maintain the updated versions of the hybrid private-public ledger (i.e., the latest, longest hybrid private-public ledger), and may provide the updated version of the hybrid private-public ledger to client devices 102, 104, and/or 106 (and additionally or alternatively, other client devices associated with other users) upon receipt of a request across network 120 and/or at regular or predetermined intervals. In some aspects, one or more of peer systems 140.

In certain instances, and in addition to a connection with network 120, peer systems 160 may be interconnected across a peer-to-peer network (not depicted in FIG. 1) using any of the wired or wireless communications protocols outlined above. Further, in some instances, one or more of peer systems 160 may function as a "miner," where any miner may be compensated in units of a virtual currency (e.g., Bitcoin™) for validating the received data and for generating updated versions of the hybrid block-chain ledger.

II. Exemplary Processes for Tracking Assets Using Hybrid Private-Public Ledgers

In some embodiments, client devices 102, 104, and/or 106 may execute one or more stored applications that enable corresponding users to track, in conjunction with peer systems 150 and other components of computing environment 100, a disposition and distribution of one or more assets using conventional, publicly available and transparent block-chain ledgers. In some aspects, the use of public block-chain ledgers to track ownership, disposition, and distribution of actual and/or virtual assets (e.g., unit of virtual currencies, such as Bitcoin™, unit of other financial instruments and securities, physical assets, etc.) may present advantages over existing centralized server systems, such as those provided by financial institutions that leverage private ledgers.

a. Asset Tracking Using Conventional Block-Chain Ledgers

Figure 2:
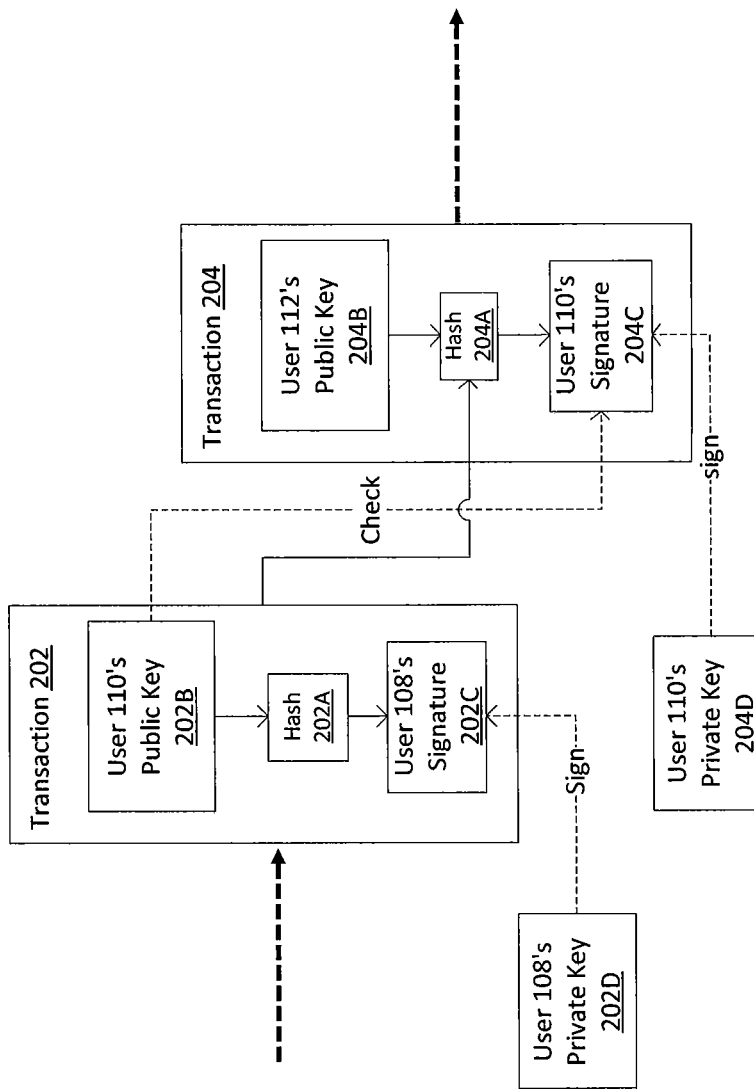
FIG. 2 is a schematic diagram illustrating a conventional block-chain ledger architecture.

FIG. 2 is a schematic diagram of an exemplary structure 200 of a conventional block-chain ledger, which may be generated through the interaction of components of computing environment 100. For example, as described in reference to FIG. 2, a user (e.g., user 110) may be associated with a device (e.g., client device 104) that executes a stored software application (e.g., a wallet application) capable of obtaining a current version of a conventional block-chain ledger from one or more networked computer systems (e.g., one of peer systems 160 configured to "mine" broadcasted transaction data and update ledgers). In some aspects, the current version of a conventional block-chain ledger may represent a "longest" block-chain ledger than includes a maximum number of discrete "blocks," which may identify transactions that transfer, distribute, etc., portions of tracked assets among various owners, including user 110.

For example, client device 104 may obtain the current block-chain ledger, and may process the block chain ledger to determine that a prior owner (e.g., user 108) transferred ownership of a portion of the tracked assets to user 110 in a corresponding transaction (e.g., transaction 202, schematically illustrated in FIG. 2). As described above, one or more of peer systems 160 may have previously data verified, processed, and packed associated with transaction 202 may be into a corresponding block of the conventional block-chain using any of the exemplary techniques described above and/or apparent to one of ordinary skill in the art.

In some aspects, as illustrated in FIG. 2, transaction 202 may include input data that references one or more prior transactions (e.g., transactions that transferred ownership of the tracked asset portion to user 108), and further, output data that includes instructions for transferring the tracked asset portion to one or more additional owners (e.g., user 110). For example, input data consistent with the disclosed embodiments may include, but is not limited to, a cryptographic hash of the one or more prior transactions (e.g., hash 202A) and the set of rules and triggers associated with the assets while the output data consistent with the disclosed embodiments may include, but is not limited to, a quantity or number of units of the tracked asset portion that are subject to transfer in transaction 202 and a public key of the recipient (e.g., public key 202B of user 110).

Further, in some aspects, the transaction data may include a digital signature 202C of user 108 (e.g., the prior owner), which may be applied to hash 202A and public key 202B using a private key 202D of user 108 through any of a number of techniques apparent to one of skill in the art and appropriate to the conventional block-chain ledger architecture. By way of example, the presence of user 108's public key within transaction data included within the conventional block-chain ledger may enable client device 104 and/or peer systems 160 to verify user 108's digital signature, as applied to data associated with transaction 202.

In an embodiment, user 110 may elect to further transfer the tracked asset portion to an additional user (e.g., user 112). For example, as described above, client device 104 may execute one or more software applications (e.g., wallet applications) that generate input and output data specifying a transaction (e.g., transaction 204 of FIG. 2) that transfers ownership of the tracked asset portion from user 110 to user 112, and further, that transmit the generated data to one or more peer systems 160 for verification, processing (e.g., additional cryptographic hashing) and inclusion into a new block of the clock-chain ledger.

For example, data specifying transaction 204 may include, but is not limited to, a cryptographic hash 204A of prior transaction 202, a quantity or number of units of the tracked asset portion that are subject to transfer in transaction 204, and a public key of the recipient (e.g., public key 204B of user 112). Further, in some aspects, the data specifying transaction 204 may include a digital signature 204C of the user 110, which may be applied to hash 204A and public key 204B using a private key 204D of user 110 using any of the exemplary techniques described above. Further, and by way of example, the presence of user 110's public key 202B within transaction data included within the conventional block-chain ledger may enable various devices and systems (e.g., client devices 106, 106, and/or 108, peer systems 160, etc.) to verify user 110's digital signature 204C, as applied to data specifying transaction 204.

As described above, one or more of peer systems 160 may receive the data specifying transaction 204 from client device 104. In certain instances, peer systems 160 may act as "miners" for the block-chain ledger, and may competitively process the received transaction data (either alone or in conjunction with other data) to generate additional blocks of the ledger, which may be appended to the block-chain ledger and distributed across peer systems 160 (e.g., through a peer-to-peer network) and to other connected devices of environment 100.

In some aspects, conventional block-chain ledger architectures described above may enable the public to review content of the ledgers and verify ownerships. Further, the decentralized nature of conventional block-chain ledgers may also enable multiple distributed networks to verify the contents of a single ledger. The resulting redundancy may render conventional block-chain ledger architecture more robust than centralized server systems, and effectively eliminate the falsification of ledger data by malicious parties.

Despite these advantages, conventional block-chain ledger architectures may exhibit significant flaws when implemented by secured, high-risk systems. By way of example, unencrypted conventional ledger blocks may represent a security concern for transactions of sensitive nature, and further, may represent a privacy concern for members of the general public. For instance, information indicative of an interaction of a prior asset owner and a corresponding device, as present within conventional block-chain ledgers, may represent private information that should not be available to future owners, let alone members of the public.

Further, if an owner were to lose or misplace a corresponding private key, the distributed nature of conventional block-chain ledger architectures, such as those described above, provide little recourse to recover possession of the one or more tracked assets. In certain aspects, the rigidity and inflexibility of these conventional block-chain ledger architectures, and their inability to adapt to changing circumstances (e.g., loss of private keys, theft of tracked assets due to fraudulent or malicious activity), often results in volatility in the usage of the tracked assets and an erosion in a public trust of conventional block-chain ledgers.

Thus, there is a need for improved systems and methods that not only enhance the security of block-chain ledger architectures for use high-risk, sensitive applications, but that also provide a framework that provides owners or holders of assets tracked by block-chain ledger architectures with recourse in an event of fraud or malicious activity, while maintaining the public availability and verification characteristic of block-chain ledgers.

b. Exemplary Hybrid Public-Private Block-Chain Ledger Architectures

The disclosed embodiments address these and other problems associated with conventional block-ledger architectures in a technical manner, by providing computer-implemented systems and methods that augment a conventional block-chain ledger with a private-master encryption key architecture that, in conjunction with an owner's pair of public and private block-chain keys, selectively encrypt ledger data to protect both a privacy of owners of tracked assets and a confidentiality of existing instruction sets maintained within the block-chain ledger.

Further, by incorporating an encrypted rules engine and corresponding list of triggering events (e.g., an event triggers list) into each block of the conventional block-chain ledger architecture (and thus generating a hybrid, public-private block-chain architecture), computer-implemented systems and methods consistent with the disclosed embodiments may perform operations that provide owners or holders tracked assets with recovery options in an event of fraud or malicious activity, while maintaining the public availability and verification characteristic of conventional block-chain ledgers.

In certain aspects, discrete data blocks of the conventional block-chain ledgers (e.g., as outlined above in reference to FIG. 2) and of the hybrid block-chain ledgers (e.g., as described in reference to FIG. 3) may include common elements of data that may specify transactions that distribute, transfer, and/or otherwise act upon portions of tracked assets. For example, these common data elements may include, but are not limited to, input data that references one or more prior transactions (e.g., a cryptographic hash of the one or more prior transactions), output data that includes instructions for transferring the tracked asset portion to one or more additional owners (e.g., a quantity or number of units of the tracked asset portion that are subject to the transaction and a public key of the recipient) and further, a digital signature applied to the input and/or output data using a corresponding public key of a current owner of the tracked asset portion. The disclosed embodiments are, however, not limited to exemplary transactions that include a transfer of tracked assets and to the exemplary data elements described above, and in further embodiments, discrete blocks of the hybrid block-chain ledgers may represent any additional or alternate transaction appropriate to the tracked assets, and further, any additional or alternate data appropriate to the tracked assets and to the transaction.

In contrast to the conventional block-chain ledgers described above, the disclosed embodiments may establish a "centralized authority" which controls the rules engine and the trigger list. The centralized authority establishes and maintains rules (e.g., through the rules engine and corresponding list of triggering events) that facilitate regulatory-based, policy-based, and customer-specified controls of transactions involving the tracked assets (e.g., units of virtual currency, etc.). The triggering event list and the rules engine vets all transactions. The centralized authority controls the rules engine, and the trigger list, while the user is able to review and possibly modify the trigger list using their own private key.

For example, and as described above, business entity 150 may represent the centralized authority, and one or more computing components of system 150 may perform operations that establish the rules engine and the list of triggering events, which may be stored within a secure data repository (e.g., data repository 144). In some aspects, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets racked in the hybrid public-private ledger, etc.). Further, and as described above, the generated and stored list of triggering events may include information that specifies causal relationships between one or more of the established rules and one or more events that trigger an initiation of one or more corresponding regulated distributions, transactions, and/or actions associated with assets tracked within the hybrid public-private ledger (e.g., the triggering events).

In some aspects, system 140 may establish one or more of the rules and/or triggering events to reflect regulations and/or policies promulgated by governmental entity, a financial regulator, and/or the centralized authority. For example, system 140 may establish a loss of a private key by user 110 as a "triggering event" that would cause system 140 to perform operations that create a new transaction and generate a new pair of public and private block-chain keys for user 110 in response to a verification of particular authentication credentials. In other aspects, system 140 may establish one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, distributions to other owners, etc.) in response to an accident involving user 110 and/or user 110's death (e.g., triggering events).

In further contrast to the conventional block-chain ledgers described above, one or more computing components of system 140 (e.g., server 142 upon execution of stored instructions) may generate additional cryptographic keys that facilitate the exemplary regulation of transactions (e.g., distributions, transfers, and/or actions) involving assets tracked within the hybrid public-private ledger. By way of example, system 140 may generate a master cryptographic key with which system 140 may encrypt the generated and stored rules engine. In some aspects, certain aspects, system 140 may store copies of the generated master key in a portion of data repository 144 that is not accessible to user 110 (and any other users), thus maintaining a confidence of the generated master key.

System 140 may also perform operations that encrypt the generated list of triggering events, either alone or in conjunction with metadata identifying the centralized authority and/or information facilitating a processing of the transaction blocks throughout the hybrid block-chain ledger. In certain aspects, system 140 may also perform operations that generate and maintain additional private cryptographic keys (e.g., a private "crypto" key) associated with each owner associated with the assets tracked within the hybrid block-chain ledger (e.g., users 108, 110, and/or 112) and further, that would enable the owners to decrypt and access the list of triggering events and additionally or alternatively, the metadata identifying the centralized authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

The disclosed embodiments may also be configured to communicate the encrypted and/or hashed rules engine and list of triggering events to owners of and/or user associated with the tracked assets through "in-band" communication processes, such as through an incorporation of the encrypted rules engine and list of triggering events into the transaction blocks of the hybrid block-chain ledger. For example, system 140 may perform operations that hash the encrypted rules engine and list of triggering events into a genesis block of the hybrid block-chain ledger, the contents of which may be incorporated (e.g., by client devices 102, 104, and/or 106, peer systems 160, etc.) into each of the subsequent transaction blocks generated and appended to the hybrid block-chain ledger. In some aspects, by incorporating the hashed and encrypted rules engine and list of triggering events into blocks of the hybrid block-chain ledger, the disclosed embodiments may ensure that the established rules are followed even in an event of actions by malicious parties to disrupt the tracked assets (e.g., instances of Bitcoin™ peeling, etc.)

Further, in some instances, the additional private crypto keys held by the owners and/or users (e.g., stored in corresponding ones of client devices 102, 104, and/or 106 and accessible to executable application programs) may enable the owners and/or users to access the encrypted list of triggering events maintained within the hybrid block-chain ledger. The owners and/or user may, through corresponding client devices, view the individual events that, when detected by system 140, could cause system 140 to perform operations that recover, authorize, audit, and/or verify the transaction and/or ownership data included within the hybrid block-chain ledger (e.g., associated with corresponding portions of the tracked assets).

In certain aspects, one or more computing components of system 140 may perform operations that modify portions of the stored rules and/or list of triggering events, e.g., in response to changes in regulations and/or policies, in response to additional owner input, etc. In order to access and modify the generated rules engine (and/or the list of triggering events) maintained within the hybrid block-chain ledger, system 140 may leverage the stored master cryptographic key to access and modify the hashed and encrypted rules engine. System 140 may, in certain instances, encrypt and re-hash the modified rules engine and submit the encrypted and hashed modified rules engine to one or more of peer systems 160 for inclusion in a block of the hybrid block-chain ledger. For example, the one or more of peer systems 160 may incorporate the hashed and encrypted modified rules engine into the hybrid block-chain ledger as a special transaction (e.g., a "0" value transaction), such that the hybrid block-chain ledger tracks each change within the modified rules engine.

Figure 3:
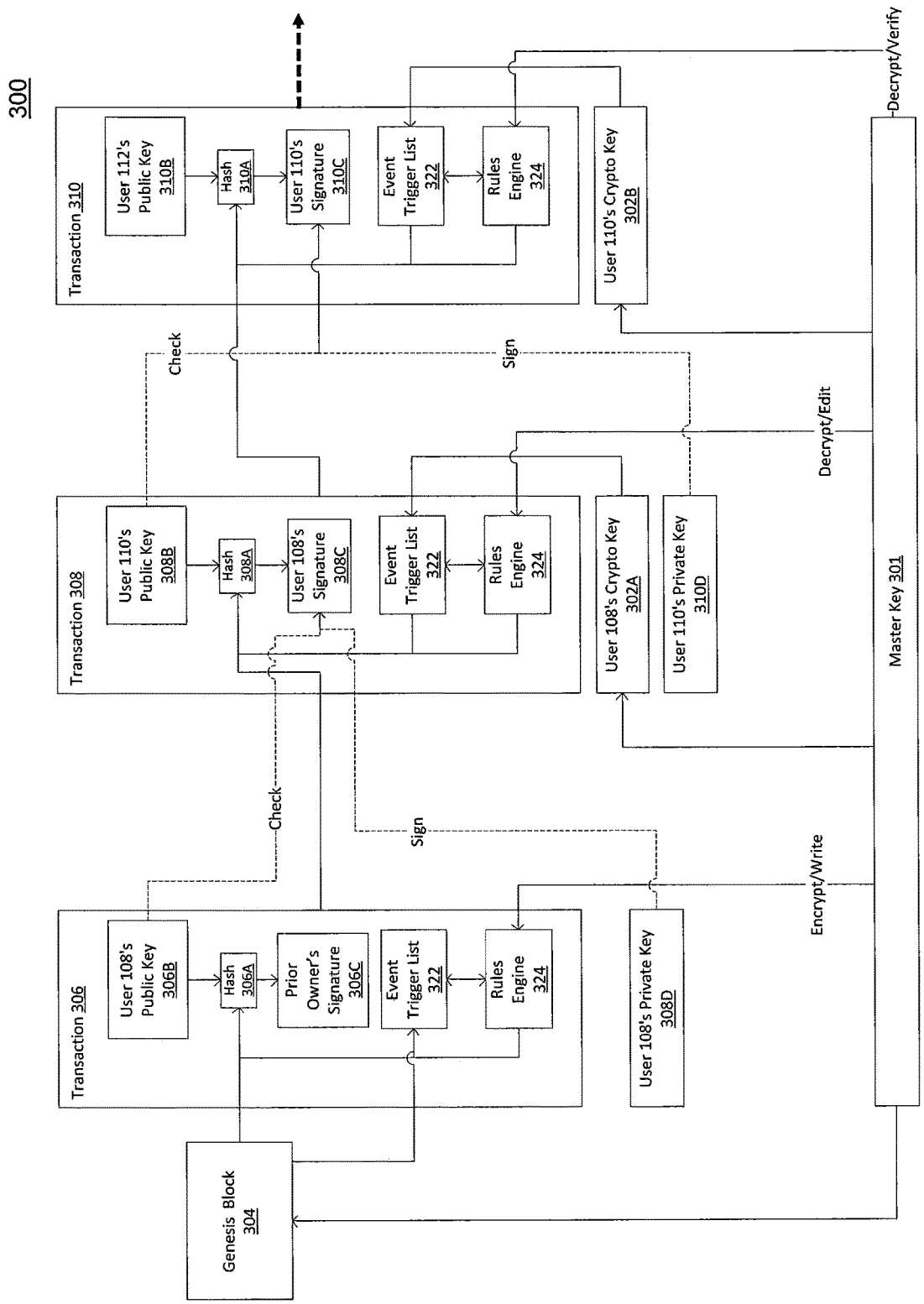
FIG. 3 is a schematic diagram illustrating a hybrid, public-private block-chain ledger architecture, consistent with disclosed embodiments.

FIG. 3 is a schematic diagram of illustrating an exemplary structure 300 of a hybrid, public-private block-chain ledger, which may be generated through the interaction of components of computing environment 100, in accordance with the disclosed embodiments. For example, as described in reference to FIG. 3, users 108, 110, and 112 may be associated with corresponding devices (e.g., client devices 102, 104, and 106), which may be configured to execute one or more stored software applications (e.g., a wallet application) capable of obtaining a current version of a hybrid block-chain ledger from one or more networked computer systems (e.g., one of peer systems 160 configured to "mine" broadcast transactions and update ledgers).

Further, in some aspects, and as described above, a system associated with a centralized authority (e.g., system 140 associated with business entity 150) may generate a rules engine that regulate transactions involving the assets tracked by the hybrid block-chain ledger (e.g., distributions, transfers of ownership, other actions, etc.), and further, a list of triggering events that, upon detection by system 140, trigger an initiation of one or more of the distributions, transfers, and/or other actions regulated by the generated rules engine. In additional aspects, and as described above, system 140 may generate a master encryption key (e.g., master key 301 of FIG. 3), which may be system 140 may maintain in a portion data repository 144, and may generate additional private "crypto" keys 302A and 302B, which may be associated with corresponding ones of users 108 and 110 In some aspects, system 140 may maintain private crypto keys 302A, 302B, and 302C in a portion of data repository 144 and provide private crypto keys 302A, 302B, and 302C to users 108, 110, and 112 through secure, out-of-band communications. System 140 may, in additional aspects, encrypt the generated rules engine and the generated list of triggering events, and further, perform operations that hash the encrypted rules engine and list of triggering events into a genesis block of the hybrid block-chain ledger (e.g., genesis block 304).

In an embodiment, one of the users (e.g., user 108) may own and/or control a portion of the tracked assets. For example, a device associated with user 108 (e.g., client device 102) may execute a stored software application (e.g., a wallet application) capable of obtaining a current version of a hybrid block-chain ledger, including genesis block 304, from one or more networked computer systems (e.g., one of peer systems 160 configured to "mine" broadcast transactions and update ledgers). In some aspects, the current version of a hybrid block-chain ledger may represent a "longest" block-chain ledger than includes a maximum number of discrete "blocks," which may identify transactions that transfer, distribute, etc., portions of tracked assets among various owners, including user 108.

For example, client device 102 may obtain the current hybrid block-chain ledger, and may process the hybrid block-chain ledger to determine that a prior owner transferred ownership of a portion of the tracked assets to user 108 in a corresponding transaction (e.g., transaction 306, schematically illustrated in FIG. 3). As described above, one or more of peer systems 160 may have previously data verified, processed, and packed data associated with transaction 306, which may be into a corresponding block of the conventional block-chain using any of the exemplary techniques described above and/or apparent to one of ordinary skill in the art.

In some aspects, as illustrated in FIG. 3, data specifying transaction 306 may include input data that references one or more prior transactions (e.g., transactions that transferred ownership of the tracked asset portion to the prior owner), and further, output data that includes instructions for transferring the tracked asset portion to user 108. For example, and as described above, input data consistent with the disclosed embodiments may include, but is not limited to, a cryptographic hash of the one or more prior transactions (e.g., hash 306A), and output data consistent with the disclosed embodiments may include, but is not limited to, a quantity or number of units of the tracked asset portion that are subject to transfer in transaction 302 and a public key 306B of user 108 (i.e., the recipient of the tracked asset portion transferred in transaction 306). Further, in some aspects, the transaction data may include a digital signature 306C of the prior owner, which may be applied to hash 306A and public key 306B using a private key of the prior owner through any of a number of techniques apparent to one of skill in the art and appropriate to the conventional block-chain ledger architecture.

Further, and in contrast to the conventional block-chain ledger architectures described above, transaction 306 may also include encrypted and/or hashed copies of rules engine 320 and trigger event list 322. In certain aspects, a device of the prior owner (e.g., which may execute one or more software applications) may access genesis block 304 (e.g., from the current version of the hybrid block-chain ledger obtained from one or more of peer systems 160), may parse genesis block 306, and may extract copies of the encrypted and/or hashed rules engine 322 and trigger event list 324. The prior owner's device may transmit to one or more of peer systems 160 along with the hash 306A, public key 306B, and digital signature 306C for verification, processing (e.g., additional cryptographic hashing) and inclusion into a new block of the hybrid block-chain ledger.

In an embodiment, user 108 may elect to further transfer that tracked asset portion to an additional user (e.g., user 110). For example, as described above, the one or more software applications executed by client device 102 may cause client device 102 to perform operations that generate input and output data specifying a new transaction (e.g., transaction 308 of FIG. 3) that transfers ownership of the tracked asset portion from user 108 to user 110, and further, that transmit the generated data to one or more of peer systems 160 for verification, processing (e.g., additional cryptographic hashing) and inclusion into a new block of the hybrid block-chain ledger.

For example, data specifying transaction 308 may include, but is not limited to, a cryptographic hash 308A of prior transaction 306, a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108 using any of the exemplary techniques described above. Further, and by way of example, the presence of user 108's public key within transaction data included within the conventional block-chain ledger may enable various devices and systems (e.g., client devices 102, 104, and/or 106, peer systems 160, etc.) to verify the user 108's digital signature 308D, as applied to data specifying transaction 308.

Additionally, and as described above, client device 102 may also parse data specifying prior transaction 306 (e.g., as obtained from the current version of the hybrid block-chain ledger) and extract encrypted and/or hashed copies of rules engine 322 and trigger event list 324. In certain aspects, client device 102 may append the encrypted and/or hashed copies of rules engine 322 and trigger event list 324 to the data specifying transaction 308 (e.g., cryptographic hash 308A, public key 308B, and digital signature 308C), and transmit the data specifying transaction 308B to one or more of peer systems 160 for verification, processing (e.g., additional cryptographic hashing) and inclusion into a new block of the hybrid block-chain ledger.

Further, and as described above, private crypto key 302A may enable client device 102 (e.g., associated with user 108) to access encrypted event trigger list 322 upon extracted from the hybrid block-chain ledger, as described above. In some embodiments, private crypto key 302A may provide client device 102 with read-only access to the encrypted event trigger list 322. In some aspects, client device 102 may obtain private crypto key 302A from system 140 using secured out-of-band communications, and additionally or alternatively, as input provided by user 108 through a web page or other graphical user interface (GUI) presented by client device 104.

In an embodiment, ownership of the tracked asset portion may be transferred from user 108 to user 110 upon verification and publication of the data specifying transaction 308 within a corresponding block of the hybrid block-chain ledger by peer systems 160. In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 3) that transfers ownership of the tracked asset portion from user 110 to user 112, and further, that transmit the generated data to one or more of peer systems 160 for verification, processing (e.g., additional cryptographic hashing) and inclusion into a new block of the hybrid block-chain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid block-chain ledger may enable various devices and systems (e.g., client devices 102, 104, and/or 106, peer systems 160, etc.) to verify the user 110's digital signature 310C, as applied to data specifying transaction 310.

Additionally, and as described above, client device 104 may also parse data specifying prior transaction 308 (e.g., as obtained from the current version of the hybrid block-chain ledger) and extract encrypted and/or hashed copies of rules engine 322 and trigger event list 324. In certain aspects, client device 104 may append the encrypted and/or hashed copies of rules engine 322 and trigger event list 324 to the data specifying transaction 310 (e.g., cryptographic hash 310A, public key 310B, and digital signature 310C), and transmit the data specifying transaction 310 to one or more of peer systems 160 for verification, processing (e.g., additional cryptographic hashing) and inclusion into a new block of the hybrid block-chain ledger. In an embodiment, ownership of the tracked asset portion may be transferred from user 110 to user 112 upon verification and publication of the data specifying transaction 310 within a corresponding block of the hybrid block-chain ledger by peer systems 160.

Further, and as described above, private crypto key 302B may enable client device 104 (e.g., associated with user 110) to decrypt event trigger list 322 upon extraction from the hybrid block-chain ledger, as described above. In some aspects, client device 104 may obtain private crypto key 302B from system 140 using secured out-of-band communications, and additionally or alternatively, as input provided by user 110 through a web page or other graphical user interface (GUI) presented by client device 104. In other aspects, client device 104 may identify and extract private crypto key 302B from a portion of the hybrid block-chain ledger obtained from peer systems 160 (e.g., as a secure in-band communication).

In the embodiments described above, system 140 may establish and maintain rules (e.g., through a rules engine and corresponding list of triggering events) that facilitate regulatory-based, policy-based, and customer-specified controls of transactions involving assets tracked within a hybrid block-chain ledger. For example, client devices 102, 104, and/or 106 may generate transaction data that includes and rules engine and list of triggering events, and one or more of peer systems 160 may embed the generated transaction data into blocks of the hybrid block-chain ledger for reference in subsequent transactions. Further, in certain aspects, system 140 may be configured to detect an occurrence of an event (e.g., based on data received from client devices 102, 104, and/or 106, etc.), may determine whether the list of triggering events includes the detected event, and when triggering event list includes the detected event, perform one or more operations consistent with an established rule that references the detected event, as described below in reference to FIG. 4.

Figure 4:
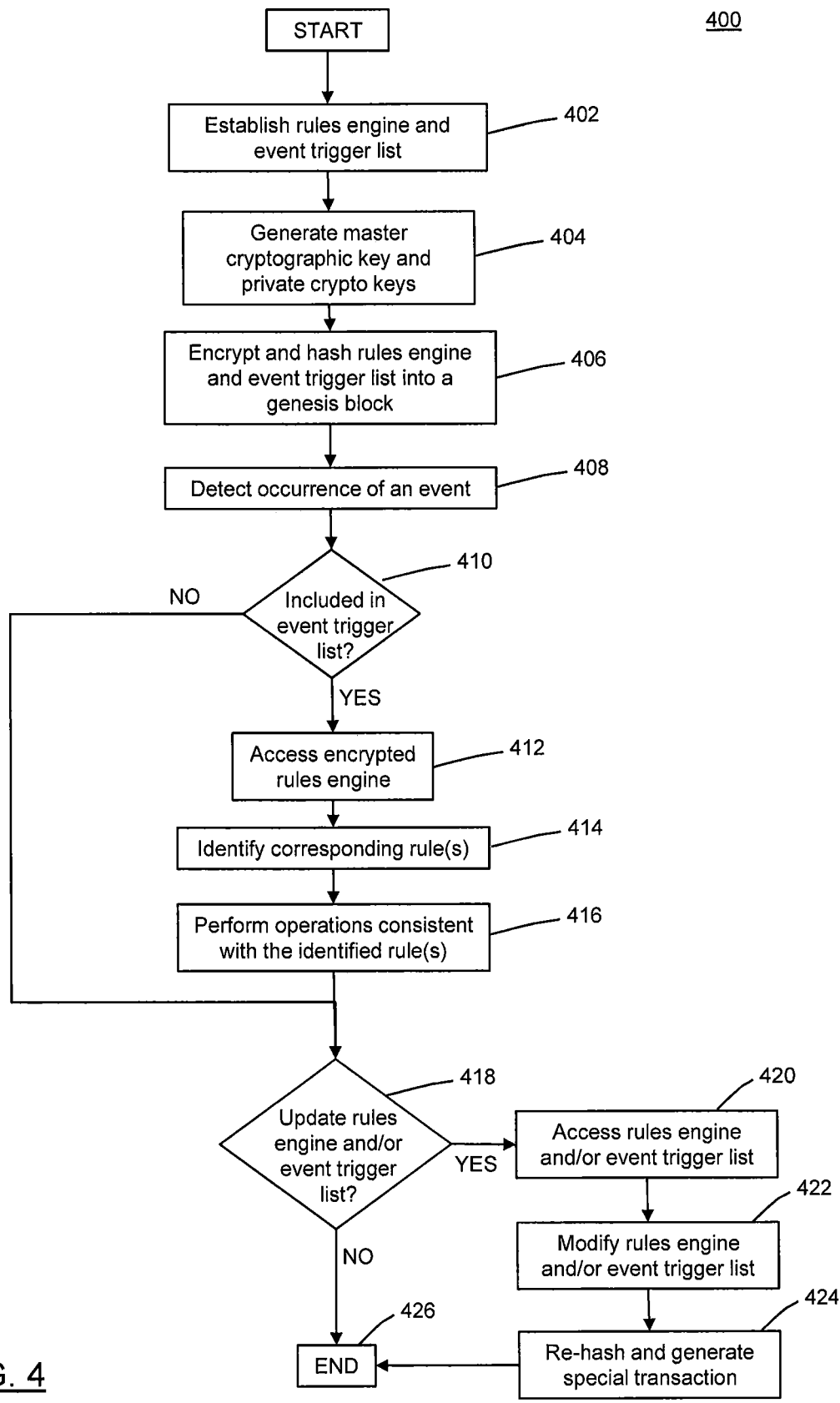
FIG. 4 is a flowchart of an exemplary process for performing event-based operations on assets tracked within a hybrid block-chain ledger, consistent with the disclosed embodiments.

FIG. 4 is a flowchart of an exemplary process 400 for automatically performing event-based operations on assets tracked within a hybrid block-chain ledger in accordance with disclosed embodiments. In an embodiment, a centralized authority may be assigned to establish regulatory-based, policy-based, and customer-specified control over assets tracked within the hybrid block-chain ledger. In some aspects, tracked assets consistent with the disclosed embodiments may include, but are not limited to, units of a virtual currency or a crypto-currency, units of financial instruments held by one or more owners, and physical assets utilized by one or more individuals and/or entities. In some aspects, a computer system associated with the centralized authority (e.g., system 140 associated with business entity 150) may execute one more stored application programs to cause system 140 to recover, authorize, audit, and/or verify an ownership of at least a portion of the tracked assets and/or transactions involving he tracked assets based on established and maintained rules.

In one aspect, one or more computing components of system 140 may generate a rules engine and a list of triggering events, which may be stored within a portion of data repository 144 (e.g., in step 402). For example, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.). Further, and as described above, the generated and stored list of triggering events may include information that specifies causal relationships between one or more of the established rules and one or more events that trigger an initiation of one or more corresponding regulated distributions, transfers, and/or actions involving assets tracked within the hybrid public-private ledger (e.g., the triggering events).

In certain instances, system 140 may establish, in step 402, one or more of the rules and/or triggering events to reflect regulations and/or policies promulgated by governmental entity, a financial regulator, and/or the centralized authority. For example, system 140 may establish a loss of a private key by user 110 as a "triggering event" that would cause system 140 to perform operations that generate a new pair of public and private block-chain keys for user 110 in response to a verification of particular authentication credentials. Further, and by way of example, system 140 may deem a documented theft of a portion of the tracked assets a "triggering event" that would cause system 140 to perform operations recover the stolen portion of the tracked assets and generate a new pair of public and private block-chain keys for user 110.

In other instances, system 140 may establish, in step 402, one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, etc.) in response to an accident involving user 110 and/or user 110's death (e.g., triggering events). The disclosed embodiments are, however, not limited to these exemplary triggering events and corresponding rules, and in further embodiments, system 140 may establish any additional or alternate rules and/or triggering events appropriate to the tracked assets, to business entity 150, and further, to users 108, 110, and 112.

Further, one or more computing components of system 140 may generate additional cryptographic keys that facilitate the exemplary regulation of transactions (e.g., distributions, transfers, and/or actions) involving assets tracked within the hybrid public-private ledger (e.g., in step 404). By way of example, in step 404, system 140 may generate a master cryptographic key with which system 140 may encrypt the generated and stored rules engine, as described above. In some aspects, certain aspects, system 140 may store copies of the generated master key in a portion of data repository 144 that is not accessible to user 110 (and any other users), thus maintaining a confidence of the generated master key.

Further, in step 404, system 140 may also perform operations that generate and maintain additional private cryptographic keys (e.g., private "crypto" keys) associated with each owner of the assets tracked within the hybrid block-chain ledger. As described above, the generated private crypto keys may enable a device of each of owner to decrypt and access the list of triggering events and additionally or alternatively, metadata identifying the centralized authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

In step 406, system 140 may perform operations that encrypt the generated and stored rules engine (e.g., using the master encryption key) and further, that encrypt the generated and stored list of triggering events (e.g., using any of the exemplary techniques described above that facilitate decryption using the private crypto keys). For example, system 140 may perform operations in step 406 that hash the encrypted rules engine and list of triggering events into a genesis block of the hybrid block-chain ledger, the contents of which may be incorporated (e.g., by client devices 102, 104, and/or 106, peer systems 160, etc.) into each of the subsequent transaction blocks generated and appended to the hybrid block-chain ledger. In some aspects, by incorporating the hashed and encrypted rules engine and list of triggering events into the blocks of the hybrid block-chain ledger, the disclosed embodiments may ensure that the established rules are followed even in an event of actions by malicious parties that disrupt the tracked assets (e.g., instances of Bitcoin™ peeling, etc.).

Further, in some embodiments, one or more computing components of system 140 may detect an occurrence of an event involving a portion of the tracked assets, an owner of a portion of the tracked assets, and/or a transaction involving a portion of the detected assets (e.g., in step 408). For example, system 140 may receive data from client device 104 that indicates user 110 lost a corresponding private block-chain key associated with a portion of the tracked assets. In other instances, system 140 may detect an event in step 140 based on data received across network 120 from one or more systems associated with local, state, and/or federal governmental entities (e.g., data from a law enforcement system notifying business entity 150 of a theft of a portion of the tracked assets, data from a local government confirming a death of an owner of a portion of the tracked assets, etc.). Further, in additional instances, system 140 may detect an occurrence of an event based on one or more sensors and devices communicatively connected to network 120 and capable of transmitting data to system 140. The disclosed embodiments are, however, not limited to these exemplary events, and in further embodiments, system 140 may be configured to detect any additional or alternate event appropriate to the tracked assets and to the components of computing environment 100.

System 140 may also be configured to access the stored list of triggering events (e.g., within database 144), and may determine whether the list of triggering events includes the detected event (e.g., in step 410). If system 140 were to identify the detected event within the list of triggering events (e.g., step 410; YES), system 140 may establish the detected event as a triggering event, and may access the encrypted rules engine using the master encryption key (e.g., in step 412). System 140 may further identify, within the accessed rules engine, one or more of the established rules that are causally related to the detected triggering event (e.g., in step 414). Further, in some aspects, system 140 may be configured to perform one or more operations, either individually or in sequence, that are consistent with the identified rules (e.g., in step 416). For example, the accessed rules engine may include information identifying the one or more operations associated with the identified rules. In other instances, at least one of the performed operations may represent a default operation associated with the identified rules (e.g., a specific type of authentication required before performing the one or more operations on behalf of user 110).

In one embodiment, one or more computing components of system 140 may also determine whether to update portions of the generated rules engine and/or list of triggering events (e.g., in step 418). For example, system 140 may identify an update or modification to one or more regulations and/or policies promulgated by governmental entity, a financial regulator, and/or the centralized authority. In other instances, system 140 may obtain, from client device 104, information updating a rule and/or triggering event previously established by system 140 based on input received from user 110 (e.g., through a web page and/or GUI presented by client device 104).

If system 140 determines to update portions of the generated rules engine and/or list of triggering events (e.g., step 418; YES), system 140 may access appropriate portions of the rules engine and/or list or triggering events in step 420 (e.g., using the master encryption key and/or any of the exemplary techniques described above), and may modify the appropriate portions of the rules engine and/or list of triggering events to reflect the updated regulations, policies, user-specified rules, and/or user-specified events (e.g., in step 422). In some instances, system 140 may modify the accessed rules engine by adding a new rule, deleting an existing rule, modifying one or more parameters of an existing rule, and/or modifying one or more operations associated with an existing rule. In other instances, system 140 may modify the accessed list of event triggers to add a new triggering event, delete an existing triggering event, and/or add or modify parameters associated with an existing triggering event.

In some aspects, system 140 may encrypt and re-hash the modified rules engine and/or list of triggering events, and may submit the encrypted and hashed modified rules engine and/or list of triggering events to one or more of peer systems 160 for inclusion in a block of the hybrid block-chain ledger (e.g., in step 424). For example, one or more of peer systems 160 may incorporate the hashed and encrypted modified rules engine and/or list of triggering events into the hybrid block-chain ledger as a special transaction (e.g., a "0" value transaction), such that the hybrid block-chain ledger tracks each change within the modified rules engine and/or list of triggering events. Exemplary process 400 is then complete in step 426.

Referring back to step 418, if system 140 were to determine that no modification to the rules engine and/or the list of triggering events is warranted (e.g., step 418; NO), exemplary process 400 may pass forward to step 426, and exemplary process 400 is complete. Further, and in reference to step 410, if system 140 were to determine that the list of triggering events fails to include the detected event (e.g., step 410; NO), exemplary process 400 may pass forward to step 418, and system 140 may determine whether to update portions of the rules engine and/or list of triggering events using any of the exemplary processes described above.

In the embodiments described above, and through the generation of the master cryptographic key and management of the generated rules engine and corresponding list of triggering events, system 140 may perform operations that recover, authorize, audit, and/or verify an ownership of at least a portion of the tracked assets and/or transactions involving the tracked assets. In certain aspects, the operations performed by system 140, which utilize hybrid block-chain ledgers consistent with the disclosed embodiments, would not be possible using the conventional block-chain ledgers described above.

For example, user 110 may be an avid user of a virtual or crypto-currency (e.g., Bitcoin™), user 110 may store a private key (e.g., private key 310D) on a laptop computer (e.g., client device 104) to generate and confirm Bitcoin™ transactions. In one instance, user 110 may unfortunately drop the laptop into a swimming pool while confirming a Bitcoin™ with private key 310D, and upon retrieved from the swimming pool, user 110 may establish that the laptop no longer functions and that data on the laptop is not recoverable.

Through a device in communication with network 120 (e.g., user 110's smartphone), user 110 may access a conventional block-chain ledger, such as those conventional architectures outlined above, and determine that the Bitcoin™ transfer was incomplete when user 110 dropped the laptop into the swimming pool. Further, user 110 may determine that the Bitcoin™ transaction represents an orphaned block within the conventional block-chain ledger, and the Bitcoins™ associated with the orphaned block are unrecoverable and permanently lost.

In other aspects, user 110 may access a hybrid block-chain ledger (e.g., as described above in reference to FIG. 3), and may determine that the Bitcoin™ transfer was incomplete when user 110 dropped the laptop into the swimming pool. In an embodiment, however, user 110 may provide input to the smartphone identifying the unrecoverable private key, which the smartphone may transmit to system 140 across network 120. In some aspects, system 140 may receive the transmitted message (e.g., in step 408), may determine that user 110's loss of private key 310D represents a triggering event (e.g., step 410; YES), and may perform operations that authenticate user 110's identity and that regenerate a pair of private and public block-chain keys for user 110, which system 140 may transmit to user 110 through any of the secure non-accessible processes outlined above (e.g., in steps 412, 414, and 416). Upon receipt of the newly generated private key, user 110 may access the hybrid block-chain ledger (e.g., through the smartphone) and confirm the Bitcoin™ transfer to recover the crypto-currency.

Further, and by way of example, user 110 may access a wallet application executed by client device 104, and further, may determine that the mobile wallet is missing a number Bitcoins™. User 110 may suspect that the loss of the Bitcoins™ represents a theft by a malicious entity, and through a complex search of a corresponding block-chain ledger (e.g., conventional block-chain ledgers described above, and/or hybrid block-chain ledgers consistent with the disclosed embodiments), user 110 may trace the theft of the Bitcoins™ to a single transaction within a corresponding block. User 110 may contact the police e-crime unit and report the theft, and the police may confirm the accuracy of user 110's allegations regarding the theft.

User 110 may, in some instances, be capable of processing the conventional block-chain ledgers described above to determine an address of the malicious entity responsible for the theft. The decentralized and anonymous nature of conventional block-chain ledgers may, however, prevent user 110 from identifying the malicious entity, and the stolen Bitcoins™ may remain permanently unrecoverable.

The disclosed embodiments may, however, address the deficiencies of conventional block-chain ledgers and provide user 110 with recourse to recover the stolen Bitcoins™. For example, the police e-crime unit may notify the centralized authority of the theft of user 110's Bitcoins™ and destination address associated with the malicious entity (e.g., through a message transmitted to system 140 and received, e.g., in step 408). System 140 may determine that the theft of the Bitcoins™ represents a triggering event included within the generated list (e.g., step 410; YES), and may perform operations that automatically create a request for a new transaction that returns the stolen Bitcoins™ to user 110 using any of the exemplary techniques described above (e.g., in steps 412, 414, and 416). System 140 may also perform operations that regenerate a pair of private and public block-chain keys for user 110, which system 140 may transmit to user 110 through any of the secure non-accessible processes outlined above (e.g., in steps 412, 414, and 416).

The hybrid block-chain ledger architectures described above may add a level of sophistication to conventional mechanisms for trustless communication by allowing transactions involving tracked assets to occur according to common transaction rules. Further, the hybrid block-chain ledger architectures consistent with the disclosed embodiments may allow owners of the tracked assets to project authority over the tracked assets by establishing customized rules for transaction authorization. Furthermore, and in contrast to the conventional techniques described above, the hybrid block-chain ledger architecture may enable a centralized authority (e.g., business entity 150 associated with system 140) to recover, audit, and/or verify an ownership of at least a portion of the tracked assets and/or transactions involving the tracked assets based on established and maintained rules.

In the embodiments described above, and through the generation of a master cryptographic key and management of a generated rules engine and corresponding list of triggering events, system 140, acting as a centralized authority, may perform operations that recover, authorize, audit, and/or verify an ownership of at least a portion of the tracked assets and/or transactions involving the tracked assets. In some aspects, and as outlined above, tracked assets consistent with the disclosed embodiments may include, but are not limited to, units of a virtual currency or a crypto-currency, units of financial instruments held by one or more owners, and physical assets utilized by one or more individuals and/or entities.

In additional aspects, the exemplary hybrid block-chain algorithms described above may track a location, performance, usage, and/or status one or more additional client devices (e.g., "connected devices) disposed within computing environment 100 (not shown in FIG. 1), which may be configured to establish communications with client devices 102, 104, and 106, and further, with system 140, using any of the communications protocols outlined above. For example, client device 102, 104, and 106, system 140, and the connected devices may be uniquely identifiable and addressable within communications network 120, and may be capable of transmitting and/or receiving data across the established communications sessions. Further, in some aspects, system 140 may be configured to establish the communications sessions with one or more of the connected devices, and to exchange data with the connected devices autonomously and without input or intervention from a user of client device 104 (e.g., user 110).

In some aspects, the connected devices may be implemented as a processor-based and or computer-based device that includes one or more processors and tangible, computer-readable memories, as described above in reference to client devices 102, 104, and 106. By way of example, connected devices consistent with the disclosed embodiments may include, but are not limited to mobile communications devices (e.g., mobile telephones, smart phones, tablet computers, etc.) and other devices capable of communicating with client device 104 (e.g., internet-ready televisions, internet-ready appliances and lighting fixtures, computing devices disposed within motor vehicles, etc.).

Further, in additional aspects, the connected devices may include sensor devices in communication with the one or more processors and the memories. The sensor devices may, in some aspects, be configured to monitor the usage, location, status, etc., of corresponding ones of the connected devices, and may be configured to provide sensor data to corresponding ones of the processors. In some aspects, the sensor data may include, but is not limited to, data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices.

In other aspects, computing environment 100 may include one or more additional computing systems in communication with the connected devices using any of the communications protocols outlined above. The additional computing system may, in an embodiments, may include one or more sensor devices capable of monitoring a location, performance, usage, and/or status of the connected devices, which may establish a "sensor network" capable of monitoring the connected devices. These additional computing systems may provide the additional sensor data to the connected devices using any of the communications protocols outlined above, either a regular intervals or in response to requests from the connected devices. In some instances, the additional computing systems may be implemented as processor-based and/or computer-based systems consistent with the exemplary systems described above.

In further aspects, the connected devices may be configured to transmit portions of the sensor data (e.g., as detected by on-board sensor devices and/or received from the sensor network) to client devices 102, 104, and/or 106 and additionally or alternatively, to system 140, using any of the communications protocols outlined above. By way of example, the sensor data may characterize and interaction between the connected devices and users 108, 110, and 112 (e.g., the monitored data may represent usage data indicative of a consumption of one or more services provided by the connected devices), and the connected devices and may transmit the usage data for users 108, 110, and/or 112 to corresponding ones of client devices 102, 104, and/or 106, which may store the received usage data in a corresponding data repository. In further aspects, the connected devices may also transmit the usage data to system 140, along with information linking specific elements of the usage data to corresponding users and/or client devices (e.g., user 110's usage data may be linked to an identifier of user 110 and/or of client device 104). In certain aspects, as described below in reference to FIGS. 4 and 5, client devices 102, 104, and/or 108 may also incorporate corresponding portions of the monitored data, e.g., as received from the connected devices, into hybrid block-chain ledgers consistent with the disclosed embodiments in order to record, track, and publicly monitor the location, performance, usage, and/or status of the connected devices.

Figure 5:
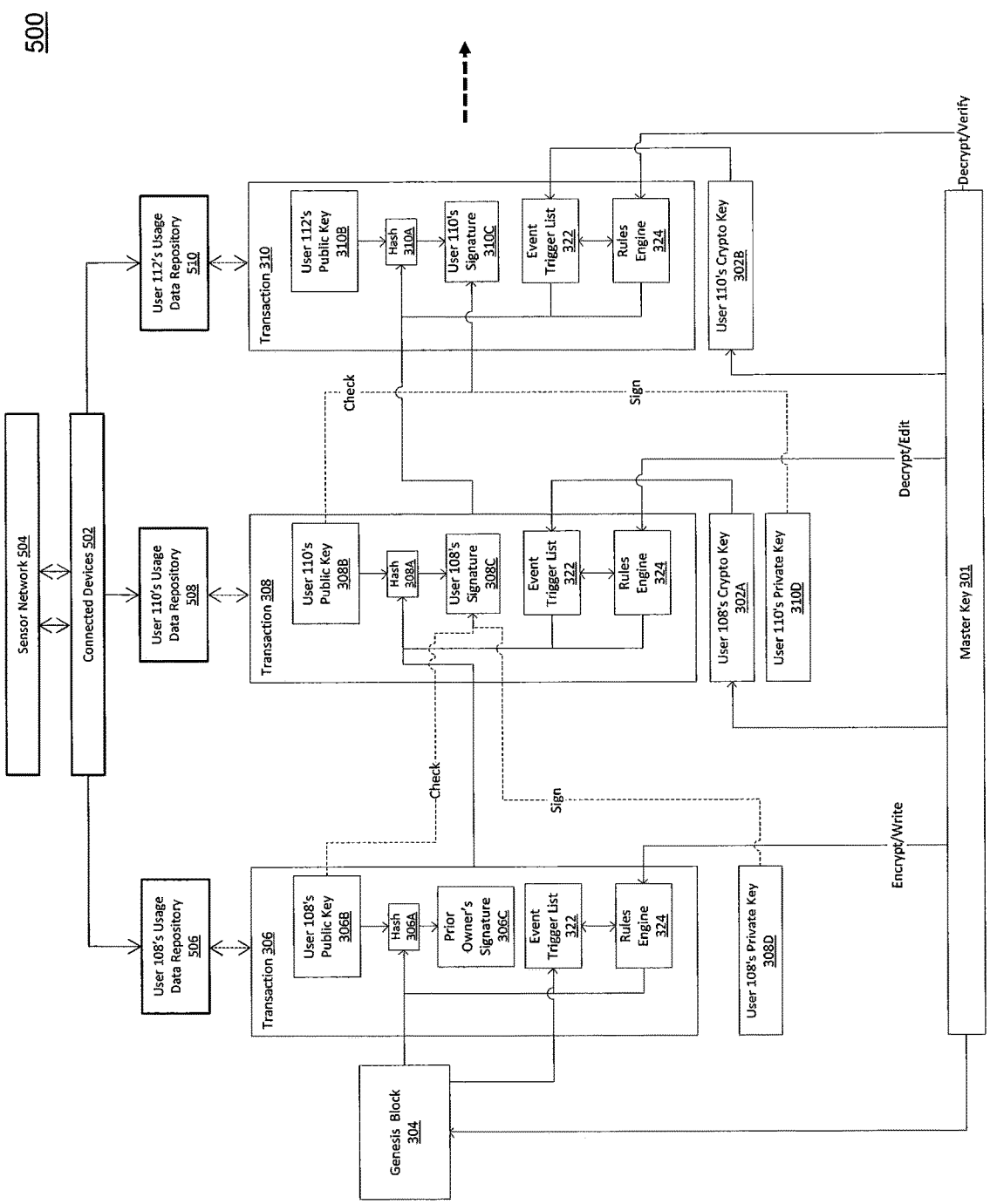
FIGS. 5 and 6 are schematic diagrams illustrating additional hybrid, public-private block-chain ledger architectures, consistent with disclosed embodiments.

FIG. 5 is a schematic diagram of illustrating an exemplary structure 500 of a hybrid, public-private block-chain ledger, which may be generated through the interaction of components of computing environment 100, in accordance with the disclosed embodiments. For example, as described in reference to FIG. 4, users 108, 110, and 112 may be associated with corresponding devices (e.g., client devices 102, 104, and 106), which may be configured to execute one or more stored software applications (e.g., a wallet application) capable of obtaining a current version of a hybrid block-chain ledger from one or more networked computer systems (e.g., one of peer systems 160 configured to "mine" broadcast transactions and update ledgers).

In some aspects, and as described above, the embodiments described in FIG. 5 may incorporate the exemplary hybrid block-chain ledger described above in reference to FIG. 3 (e.g., hybrid block-chain ledger structure 300), and may augment hybrid block-chain ledger structure 300 to include and track monitored data indicative of a location, performance, usage, and/or status of one or more connected devices 402 disposed within environment 100 and in communication with client devices 102, 104, and 106. For example, and as described above, connected devices 502 may be implemented as processor-based and/or computer-based systems that include one or more processors and corresponding tangible, non-transitory computer-readable memories.

Further, the one or more processors of connected devices 502 may obtain sensor data from one or more on-board sensor devices capable of monitoring connected devices 502 and additionally or alternatively, from one or more external sensor devices disposed within additional computing systems in communication with connected devices 502. The on-board and external sensor devices may, in some aspects, collectively form a sensor network 504 that generates and provides sensor data to the connected devices. For instance, and as described above, the sensor data may include, but is not limited to, data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices. In some aspects, the connected devices may be configured to transmit portions of the received sensor data to corresponding ones of client devices 102, 104, and 106, and to system 140, using any of the communications protocols outlined above (e.g., through peer-to-peer communications, etc.).

For example, the sensor data received by connected devices 502 may specify a usage or a consumption of one or more services of the connected devices by corresponding ones users 108, 110, and 112 (e.g., associated with client devices 102, 104, and 106). In some aspects, portions of the usage data attributable to corresponding ones of users 108, 110, and 112 may be transmitted to corresponding ones of client devices 102, 104, and 106, and further, to system 140. In further aspects, the user-specific portions of the usage data may be stored within corresponding user-specific usage data repositories (e.g., usage data repositories 506, 508, and/or 510 of FIG. 4). In some embodiments, as described below in reference to FIG. 5, client devices 102, 104, and/or 106, in conjunction with system 140, may augment the exemplary hybrid block-chain ledger structures described above to include usage data and corresponding metadata, thus enabling the hybrid block-chain ledger to monitor the location, performance, usage, and/or status of the connected devices over time (e.g., during transfers in ownership of the connected devices, use of the connected devices as collateral, etc.).

Figure 6:
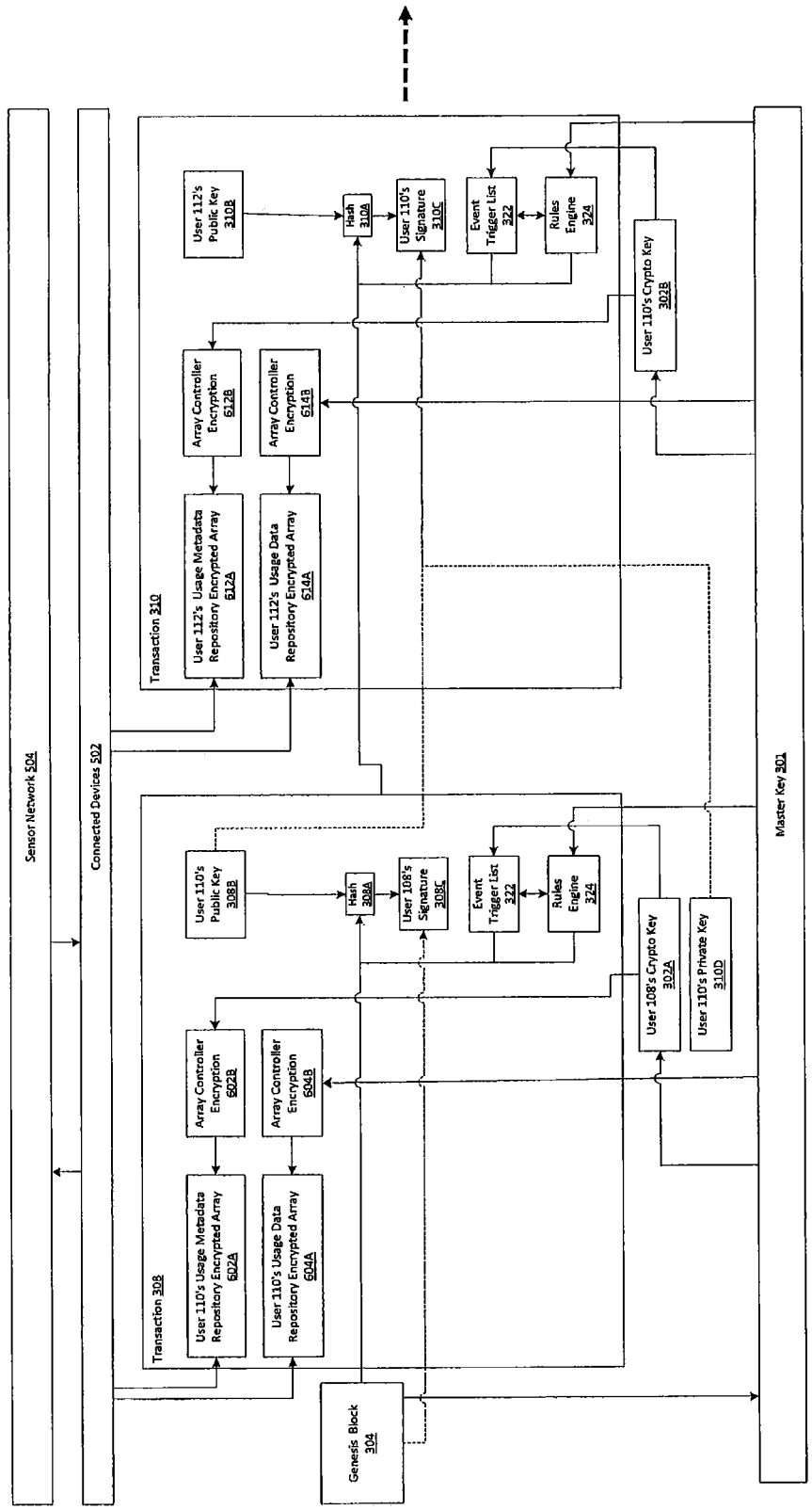

FIG. 6 is a schematic diagram of illustrating an exemplary structure 600 of a hybrid, public-private block-chain ledger, which may be generated through the interaction of components of computing environment 100, in accordance with the disclosed embodiments. For example, as described in reference to FIG. 6, users 108, 110, and 112 may be associated with corresponding devices (e.g., client devices 102, 104, and 106), which may be configured to execute one or more stored software applications (e.g., a wallet application) capable of obtaining a current version of a hybrid block-chain ledger from one or more networked computer systems (e.g., one of peer systems 160 configured to "mine" broadcast transactions and update ledgers).

In some aspects, and as described above, the embodiments described in FIG. 5 may incorporate the exemplary hybrid block-chain ledger described above in reference to FIGS. 3 and 5 (e.g., hybrid block-chain ledger structures 300 and 400), and may augment hybrid block-chain ledger structure 300 of FIG. 3 to include and track monitored data indicative of a location, performance, usage, and/or status of one or more connected devices 502 disposed within environment 100 and in communication with client devices 102, 104, and 106, as received from sensor network 404.

For example, and as described above, a prior user (e.g., user 108) may elect to further transfer a portion of tracked assets to an additional user (e.g., user 110). For example, as described above, the one or more software applications executed by client device 102 may cause client device 102 to perform operations that generate input and output data specifying a new transaction (e.g., transaction 308 of FIG. 6) that transfers ownership of the tracked asset portion from user 108 to user 110, and further, that transmit the generated data to one or more of peer systems 160 for verification, processing (e.g., additional cryptographic hashing) and inclusion into a new block of the hybrid block-chain ledger.

For example, data specifying transaction 308 may include, but is not limited to, a cryptographic hash 308A of a prior transaction (e.g., which transferred ownership to user 108), a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108 using any of the exemplary techniques described above. As described above, the presence of user 108's public key within transaction data included within the conventional block-chain ledger may enable various devices and systems (e.g., client devices 102, 104, and/or 106, peer systems 160, etc.) to verify the user 108's digital signature 308D, as applied to data specifying transaction 308. Further, and as described above, client device 104 may also parse data specifying the prior transaction and extract encrypted and/or hashed copies of rules engine 322 and trigger event list 324.

Additionally, in some aspects, the data specifying transaction 308 may also include user 108's usage data (e.g., as received from connected devices 402 using any of the exemplary techniques described above), which may be encrypted using master key 301 (e.g., by array controller encryption 604B) to generate an encrypted array 604A of user 108's usage data. In further aspects, the data specifying transaction 308 may also include metadata indicative of a duration of usage, time, date, location, and/or other network connected devices in proximity, which may be encrypted using user 108 private crypto key 302A (e.g., by array controller encryption 602A) to generate an encrypted array of metadata 602A.

In certain aspects, client device 102 may append the encrypted and/or hashed copies of rules engine 322 and trigger event list 324 to the data specifying transaction 308 (e.g., cryptographic hash 308A, public key 308B, and digital signature 308C) and the usage data (e.g., encrypted arrays 602A and 604A and array controller encryption 602B and 604B), and transmit the data specifying transaction 308 to one or more of peer systems 160 for verification, processing (e.g., additional cryptographic hashing) and inclusion into a new block of the hybrid block-chain ledger.

In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 6) that transfers ownership of the tracked asset portion from user 110 to user 112, and further, that transmit the generated data to one or more of peer systems 160 for verification, processing (e.g., additional cryptographic hashing) and inclusion into a new block of the hybrid block-chain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid block-chain ledger may enable various devices and systems (e.g., client devices 102, 104, and/or 106, peer systems 160, etc.) to verify the user 110's digital signature 310C, as applied to data specifying transaction 310.

Further, and as described above, data specifying transaction 310 may also include user 110's usage data (e.g., as received from connected devices 402 using any of the exemplary techniques described above), which may be encrypted using master key 301 (e.g., by array controller encryption 614B) to generate an encrypted array 614A of user 108's usage data. In further aspects, the data specifying transaction 308 may also include metadata indicative of a duration of usage, time, date, location, and/or other network connected devices in proximity, which may be encrypted using user 110's private crypto key 302A (e.g., by array controller encryption 612B) to generate an encrypted array of metadata 612A.

In certain aspects, client device 104 may append the encrypted and/or hashed copies of rules engine 322 and trigger event list 324 to the data specifying transaction 310 (e.g., cryptographic hash 310A, public key 310B, and digital signature 310C) and the usage data (e.g., encrypted arrays 612A and 614A and array controller encryption 612B and 614B), and transmit the data specifying transaction 310 to one or more of peer systems 160 for verification, processing (e.g., additional cryptographic hashing) and inclusion into a new block of the hybrid block-chain ledger.

In certain embodiments, as described above, the inclusion of usage data within hybrid block-chain ledgers maintains an continuous log of usage and/or consumption of connected-device resources by users 108, 110, and 112, and any additional or alternate users that generate and submit (through corresponding client devices) transaction data to one or more of peer systems 160. In further aspects, the sensor data (e.g., as received from connected devices 402) may be batched in a periodic set and treated as a transaction, and additionally or alternatively, may be appended into an associated repository of the transaction block-chain (e.g., using system 140, peer systems 160, etc.).

Further, in some aspects, the exemplary block-chain ledgers described above may facilitate processes that track an ownership of one or more of the connected devices and further, enable current owners (e.g., user 110) to transfer ownership to others (e.g., user 112). For example, when the disclosed embodiments create a new block to account for usage data, a private key of the current owner may be user to authenticate the usage and allow for the generation of the new block. In other aspects, a private key linked to a device of the current owner (e.g., stored locally on a memory of the current owner's device) may authenticate the usage and allow for the generation of the new block without input or intervention from the current owner. In some instances, the private key of the current owner's device may differ from the current owner's private key, Further, and in some embodiments, the automated and programmatic authentication of the usage by the current owner's device may reduce instances of under-reported usage data associated with owner-initiated authentication protocols.

III. Exemplary Use Cases for Hybrid Private-Public Ledgers a. Behavior Tracking Using Connected Devices In other aspects, the disclosed embodiments may enable a business entity 150 (e.g., a financial institution) to track users' behavior and their ability to "care for" and/or "keep in good maintenance" one or more owned items (e.g., connected devices, such as cars, clothing, and appliances) and/or one or more financial obligations (e.g., timely monthly mortgage payments, timely payments of credit card bills, no overdrafts, etc.). For example, business entity 150 may, through system 140, monitor and collect user 110's historical behavior data in order to determine a "care score," which may factor into a credit adjudication process for user 110. For example, when system 140 accesses a block-chain repository to determine user 110's "care score,", system 140 may decrypt the current version of the hybrid block-chain ledger using the master key, and determine a score for either a specific category of products or an overall score based on the sensor data. System 140 may establish the "care rating" for user 110 based on the determined score. Further, the disclosed embodiments may maintain a record of corresponding usage data (e.g., within the disclosed exemplary hybrid block-chain ledgers) and adjust a deprecation value, which system 140 may store along with a unique identifier value as a key value pair.

The disclosed embodiments may also facilitate processes that group subsets of connected devices (e.g., various office equipment), track a usage of these connected devices as a group, and an aggregate the above-described calculations for the group of connected devices. In some aspects, the tracking and manipulation of group usage data may balance out the heavy use of a singular item with items which are used infrequently.

Further, in some aspects, each of connected devices 402 may provide data indicative of usage, care, maintenance, and repayments to a centralized server (e.g., a server of system 140), which may perform operations that update a creditworthiness of an owner based on the predicted life of connected devices 402 and risk exposures (e.g., for purposes of providing insurance) in real time. The disclosed embodiments may, for example, reward good behavior from an individual with rewards of better terms and/or penalize poor behavior, and thus customizing both load and insurance product to the individual.

For instance, and consistent with the disclosed embodiments, office equipment and company car of a business owner may represent "connected devices," and the disclosed embodiments may monitor usage of the connected devices based on embedded sensors and/or a surrounding network of sensors disposed within in the environment. In some aspects, portions of the office equipment may be used infrequently (e.g., as most of the business is off premises), and system 140 may establish, based on the usage data, that the office equipment experiences a relatively low level of depreciation, while the company car experiences a substantial amount of depreciation. Consistent with the disclosed embodiments, system 140 may assign a "medium" deprecation rating to the collective group of connected devices (e.g., the office equipment and the company car) based on the usage data, and system 140 may leverage this information when the business owner attempts to collateralize these connected devices, e.g., in support of a loan application.

b. Ownership Tracking of Connected Devices and Payment

Additionally, conventional block-chain ledgers are often inadequate to track a partial ownership of various assets, as ownership rights and agreements change over the course of time. Moreover, actual cosigners of loans or accounts may experience difficulty in establishing their own individual responsibility in the instances of partially owned assets.

Hybrid block-chain ledgers consistent with the disclosed embodiments may, in some aspects, provide a shared ledger payment mechanism that, at the time of purchase settlement, assigns ownership to a purchased item by making a connection to the item and embedding the item with an unique owner identifier, timestamp and purchase value. If there were split ownership of the item, the disclosed embodiments may record the multiple owners as a value pair and register corresponding percentages of ownership. The disclosed embodiments may further complete registration of the purchased item within the hybrid block-chain ledger, which tracks the ownership and allows the system and/or devices of devices periodically check-in with the ledger system to maintain a corresponding ownership record.

By tracking partial ownership of assets, hybrid block-chain ledgers consistent with the disclosed embodiments may allow for real-time tracking of individual contributions spread over the entire ownership structure. In certain aspects, the real-time tracking provided by the disclosed embodiments may be useful in partial ownership situations with complex disbursement schemes. For example, using any of the exemplary techniques described above, system 140 may perform operations that automatically disburse profits according to the ownership and/or disbursement arrangements and/or create new genesis blocks based on the ownership instructions set forth within event trigger list 322 and/or rules engine 324.

For instances, a husband and wife may jointly purchase car for $10,000. Upon the completion of payment for the car, system 140 may determine that husband contributed 60% of the cost, and the wife contributed 40% of the cost. In some aspects, rules engine 324 may include rules establishing joint ownership on the basis of the proportional contributions of the husband and wife, and in the event of divorce (e.g., a triggering event within event trigger list 322), system 140 may distribute the ownership in accordance with rules engine 324. The disclosed embodiments are, however, not limited to property settlements subsequent to divorce, and event trigger list 322 and/or rules engine 324 may include additional data that supports the disbursement of profits upon sales of items and/or within a partnership.

Further, a startup company may exhibit a distributed ownership structure including three co-founders and an investor owner. In certain aspects, rules engine 324 may include an existing payment structure rule that specifies a distribution of profits among the co-founders and the investor. When the startup company is acquired or receives funding, system 140 may detect a triggering event, and rules engine 322 proceeds to create a new ownership structure, and creating a new genesis block.

c. Automated Ownership Transfers

Using conventional block-chain ledger systems, all entries are made sequentially and are generated in a wide range of applications, which can lead to delays in executing the transactions. Many transactions, however, follow a standardize set of rules based on events associated with the owner. In some aspects, the disclosed hybrid block-chain ledgers may facilitate a transfer of ownership of tracked assets in response to an occurrence of a set of standardize events, thus expediting disbursement and ownership transfers, and reducing the need for protracted analysis of the ownership structures.

The disclosed embodiments may, for example, track an ownership of connected devices based on a unique identifier and periodic checks with a network connection, which may be aggregated with associated data (e.g., value, purchase time, usage duration, geo-location, etc.) to form a connected asset inventory system. If items cannot periodically check into the ownership network, system 140 may prompt the customer will be prompted to reconcile, or a public network may request independent verification.

The disclosed embodiments may also establish a number of predetermined trigger conditions which, when triggered, execute the sale or disbursement and re-allocation of ownership of items registered with the connected asset inventory system. These predetermined instructions may be stored on a ledger system, and the event and completion of the disbursement may be validated by the pubic "miners" (e.g., pee systems 160).

In some aspects, transactions related to ownership of a particular property may be added to the exemplary hybrid block-chain ledgers described above. System 140, acting on behalf of the centralized authority (i.e., business entity 150) may generate a genesis block in partnership with a manufacturer/retailer at the time of purchase, and/or appends information from a genesis block created by a manufacturer. System 140 may also generate a set of rules for ownership transfer based on input from the individuals involved in the transfer, which may be incorporated into the hybrid block chain ledger as a rules engine (e.g., rules engine 322) using any of the exemplary techniques described above. Public portions of hybrid block-chain ledgers consistent with the disclosed embodiments may verify a current status of ownership, and when a preset event or criteria is reached (e.g., within event trigger list 322), system 140 performs operations that initiate a transfer of ownership of the property based on the established rules, and the ownership transfer is updated through the distributed network.

For instances, life insurance claims processes may proceed upon a death of a family member and a receipt of an official "certified" death certificate from a governmental entity (e.g., trigger events). The disclosed embodiments may, in some aspects, require that the ledger "miners" of peer systems 160 validate the trigger events as well as validate the completion of the "disbursement" or payment event.

Further during estate planning, the disclosed embodiments may "tag" or track every asset that uses a network connection to generate and create rules around automatic disbursements. Upon an event trigger/confirmation (e.g., as specified in event trigger list 322), system 140 automatically puts into effects the rules created by a customer (e.g., as stored within rules engine 324). The automated transfer of ownership may, in some aspects, reduce the workload of an executor and track all changes made to the event triggers, which allows for greater clarity.

d. Processes for Tracking Earmarked Distributions

In certain aspects, many electronic funds transfers are earmarked for specific uses and/or for specific purchases of certain types of products (e.g., earmarked donations, child support, welfare, kid's allowance, some government grants, etc.). Using conventional processes, it may be difficult to track and verify that the allotted funds are used strictly on allowed purchases. Furthermore, using conventional processes, an individual that provides funds may rely on reports the individual spending the funds the earmark has been respected, and moreover, the appropriate use of funds may often be taken on faith.

The disclosed embodiments may enable a hybrid block-chain ledger to create and enforce rules controlling transfer of earmarked funds, thus providing a systematic mechanism for tracking and controlling spending. For example, system 140 may establish (e.g., in rules engine 322) a set of allowed transaction rules that enforce the set of earmarks for particular funds.

In some aspects, these systems could be used in international remittance, where funds are sent for specific uses. If the transaction is earmarked for specific items and/or types of items, the established rules may be incorporated into an encrypted event trigger list and/or rules engine (e.g., by system 140) within the transaction block sending the funds overseas, as described adobe. The recipient of the fund will be able to review the trigger events that facilitate a use of the particular funds, and if they attempt to use the funds in a way that violates the transaction earmarks, the transaction could be refused, and/or the provider of the fund could be notified.

In some aspects, system 140 may establish rules within the rules engine (e.g., rules engine 324) that allow compliant transactions to proceed, while initiating a set of contingency steps transactions outside of the earmarks. These steps may, but are not limited to, include notification of the originating party, flagging the transaction, denying the transaction to name a few.

For example, a customer of business entity 150 (e.g., user 110) may intend to send money to his parents to repair their roof in a remote village in China. User 110's parents do not have a bank account, so user 110 must send the money through an intermediary (e.g., user 112). User 110 may worry that user 112 may use the funds inappropriately, leading to an unrepaired roof. In some aspects, user 110 may transfer funds using the exemplary hybrid block-chain described above, and may establish (e.g., within event trigger list 322 and/or rules engine 324) an earmark for s contractor already selected for the roof repairs. Although user 112 believes she can get a better deal by getting the roof repaired by a different contractor, user 112 access event trigger list 322 (e.g., using user 112's private crypto key) and determines that the different contractor cannot be paid with user 110's funds.

e. Shipping Beacons Based on Connected Devices

The consumer market may be moving towards a model where purchases are made directly from manufacturers. In some instances, as the point of purchase becomes closer and closer to the manufacturers, inherent problems exist in tracking and paying for these goods in an equitable way that protects both the manufacturer and the purchaser. For example, using conventional processes, a cost of a product is paid up-front by a purchaser, who relies on the seller's reputation and ethical behavior to produce and ship the product. As smaller manufacturers enter the market place and purchases are made on a global scale, these conventional payment processes are often unable to account for the realities of modern consumer and manufacturer behavior.

Using the disclosed embodiments, the exemplary hybrid block-chain ledgers described above may for a basis for a payment system that tracks the good/product through its shipping route, thus mitigating risks associated with remote purchases, and incentivizing manufacturer to produce and ship their products on schedule. For example, upon the purchase of good from a manufacturer, system 140 may establish a payment and shipment schedule, which may be included within event trigger list 322 and/or rules engine 324. Further, upon acceptance of the conditions by the manufacturer, and system 140 may disburse an initial amount of funds to the manufacturer and create an appropriate genesis/new block using any of the exemplary techniques described above.

A trusted shipping party (e.g., FedEx™, DHL™, etc.) may utilize a private key to sign transactions along one or more stages of shipping of the product, and a partial disbursement of funds may occur at these stages to both the trusted shipping party and the manufacturer. As the shipment crosses set target checkpoints (e.g., International borders, customs, provincial/state boundaries, etc.) further partial disbursement is made as the trust shipping party signs transactions within the hybrid block-chain ledger. When the purchaser signs the receipt of the product into the hybrid block-chain ledger, system 140 may perform operations to make the final disbursement, thus settling all accounts of the shipment.

For example, a customer of business entity 150 (e.g., user 110) may purchase ten barbecues from an overseas manufacturer for use and distribution to friends and family. User 110 may approach business entity 150 and request establishment of a disbursement schedule for the manufacturer based on the exemplary hybrid block-chain ledgers described above. System 140 may, in some aspects, create a transaction in the hybrid block-chain ledger that holds user 110's payment (e.g., an escrow account), and system 140 may establish rules that sequentially disburse the payment when the item ship, when the items clear customs, when they are in the same town as user 110, and finally when user 110 is able to sign for items after inspection.

f. Clearinghouse Models for Contract Settlement

In some instances, "smart contracts" that leverage conventional block-chain ledgers may serve to enforce agreements in a timely and efficient manner creating a permanent record of the transaction with all the enforceable rules associated with the contracts. In further aspects, the use of the exemplary hybrid block-chain ledgers described above allows the terms of these smart contracts to be modified by a centralized authority to accommodate the changing realities of the real world. Problems remain, however, surrounding the reconciliation of disputes and/or the initiation of transactions by the centralized authority to correct problems in the list of transactions.

In some aspects, the exemplary hybrid block-chain ledgers described above may be further augmented to include a "side" block-chain ledger that tracks any automated transactions initiated either by the rules residing on the hybrid block-chain ledger (e.g., event trigger list 322 and/or rules engine 324) or by a centralized authority having power to enact a transaction outside of normal transaction usage. When a rule-based or centralized-authority-initiated transaction occurs, the associated supporting documentation and triggering events may be tracked in a special transaction category that requires validation by neutral third party to verify that the transaction is in-line with the set of rules/agreements allowed on those particular smart contracts. These processes allow for reconciliation of assets, funds, and ledger tracked items via a neutral third party. The disclosed embodiments may also allow for parties involved in the transaction to request reviews of transactions in cases of errors or conflicting triggering events, and a neutral third party may act as an arbitrator in the cases where conflict exists.

For example, the disclosed embodiments may enable a customer of business entity 150 (e.g., user 110) to create, within a hybrid block-chain ledger, a contractor renovating user 110's house. The smart contract may, in some aspects, specify scheduled disbursements based on mutually agreed-upon inspections of work. In one instance, the contractor presents and inspection report to a corresponding financial institution to receive a scheduled disbursement. Upon receipt of a notification of the disbursement, user 110 requests that system 140 recovers the disbursement, and user 110 has not completed the requisite and triggering inspection, and system 140 generates non-compliance rules (e.g., within rules engine 324 using the master key or within the side block-chain) to recover user 110's funds. The contractor may, however, argue to the financial institution that the required inspection has occurred and provides a corresponding report (that was not signed off by user 110's private key). Business entity 150 and the contractor's financial institution may initiate an automated arbitration between user 110 and the contractor against the terms of the smart contract. The arbitration finds in favor of user 110, who recovers the funds, and system 140 records the arbitration decision into corresponding transaction data for submission to peer systems 160, as described above.

g. Document Tracking Using Hybrid Block-Chain Ledgers

In further instances, processes that maintain deeds and other important document are crucial for proper record keeping and accessibility. The disclosed embodiments may be configured to the records are maintained in a secure, accessible repository and available to prove ownership or an occurrence of an event in a case of conflicting documentation. For example, the disclosed embodiments may hash a document into the exemplary hybrid block-chain ledgers described above using a secure, known pixel replacement to add further encryption. The hashed document may also be used in the case of transactions, and an ownership chain may be maintained. Further, using the hybrid block-chain ledgers described above may enable financial institutions and other entities that provide loans secured against any of these deeds to automatically execute liens in the case of default on the loan. Further, the use of secured images may also provide further security, especially in a case of conflicting documentation.

h. Counterfeit Prevention

Processes that prevent an introduction of counterfeit manufactured goods into the marketplace are essential to preserve the intellectual property rights of manufacturers and ensure that criminal activities do not negatively affect legitimate manufacturers. In many instances, however, manufacturers lose track of their goods once they leave their manufacturing plant and move into the hands of shipping partners or distribution partners, leaving the possibility that losses may occur before a customer is able to purchase the product. The disclosed embodiments may provide a mechanism to track a legitimate product through its lifecycle and control and confirm transactions involving the legitimate product, thus reducing an ability of counterfeiters to enter and disrupt the marketplace.

For example, the exemplary hybrid block-chain ledgers described above may function as a public repository of products that tracks ownership chains. The exemplary hybrid block-chain ledgers described above may also provide a centralized authority functionality that enables manufacturers to establish rules around transaction (e.g., minimum pricing, authorized dealer location, etc.). The centralized authority functionality may also be shared with a financial institution (e.g., business entity 150) to control financing terms or transaction funds.

Further, while conventional block-chain ledgers may enable an individual to verify if the product has an authentic chain of custody, manufacturers would have very little control over the distribution channels and how their products are traded. Through the disclosed embodiments, these same manufacturers would have the ability to identify goods not offered for sale, or set targeted minimum pricing for certain geographies to address "grey-market activities" associated with these products.

For instances, a customer of business entity 150 may be a manufacturer and direct sale merchant of a specialized biomedical product with strict export regulations and a targeted regional sale strategy. The customer may work with business entity 150 to incorporate regional sales rules into a hybrid block-chain ledger for each product during manufacturing (e.g., within event trigger list 322 and rules engine 324). Due to import restrictions one of the rules may specify a location of sales for each product, and a manufacturer may receive an automated message indicating that a product intended for a developing market is being transacted in the Europe. Working with business entity 150 and local authorities, the financial transaction is flagged, and the product recovered due to usage agreement violations. In some aspects, system 140 may perform operations that revert an immediately prior transaction back to the customer to facilitate the recovery of their products for proper deployments.

i. Value Tracking Using Block-Chain Ledgers to Capture Customer Interactions

Today, a deep understanding of the relationship between a customer and a business is paramount in delivering a legendary customer experience. Unfortunately, the fragmented nature of existing corporate structures presents a complex challenge in trying to accurately capture the various touch points experienced by a customer. This is especially true of large corporate entities such as financial institutions, which offers a wide portfolio of products which may operate as separate lines-of-businesses (LOBs) under the same corporate banner. The fragmented nation of these existing corporate structures can thus lead to multiple approaches in providing customer service. The lack of cross-LOB integration may lead to an environment with very low cohesive customer management, which may also lead to an inability to track and quantify cross-LOB referrals and interactions. The disclosed embodiments may provide mechanisms for tracking customer interactions across different LOB's that provide not only a customer-centric view, but also with techniques for tracking the intrinsic value of each interaction with the customer.

In some aspects, the exemplary hybrid block-chain ledgers described above may be configured to track and reward referral programs for a single customer in a multi-LOB environment. Within a hybrid block-chain ledger, the interactions and activities between a customer and staff can be recorded as a transaction, and the value generated by the transaction can be added to the hybrid block-chain ledger and compared the expected value of the referral. Effectively tracking the value of each interaction and referrals should allow greater visibility and transparency of the value generation chain. This increased transparency can be used to optimize the incentives for all participants.

Systems and processes consistent with the disclosed embodiments may, in some aspects, integrate all communication channels into a single tracking system, and provides a platform upon which referrals can be monetized. These exemplary systems and processes can further increase the value proposition for each customer going through this interaction. Thus, disclosed embodiments this exhibit advantages over existing systems which leverage conventional block-chain ledgers.

The exemplary hybrid block-chain ledgers described above can further be augmented by allowing for incentives and payouts to occur in the transaction allowing for direct justification of the payouts. The augmentation would reduce the need to maintain records of all transaction, referrals and sales as it would be integrated into a single location in the hybrid block-chain ledgers.

In the hybrid block-chain model described above, the rules surrounding how incentives and payouts are made can be controlled by a central authority, thereby automating the referral processes (e.g., in event trigger list 322 and/or rules engine 324). The participants should be able to view the triggers which can translate to the actions, or thresholds associated with the incentives. But the actual distribution can be controlled by the rules engine hashed within in the exemplary hybrid block-chain ledger.

In some aspects, system 140 may combine multiple trigger events (e.g., within even trigger list 322) to invoke the rules engine (e.g., rules engine 324), which may change the set rewards and incentives. The multiple trigger events may include, but are not limited to, a certain transaction value, sale, customer interaction, a referral, and/or a combination thereof.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a communications unit;
   a memory storing instructions; and
   at least one processor coupled to the memory and to the communications unit, the at least one processor being configured to execute the instructions to:
   obtain first encrypted data from at least one element of a distributed ledger, and decrypt the first encrypted data using a private cryptographic key associated with an asset tracked by the distributed ledger;
   when an event involving the tracked asset corresponds to a triggering event identified within the decrypted first data, obtain second encrypted data that identifies a plurality of rules from the at least one element of the distributed ledger, and decrypt the second encrypted data using a master cryptographic key associated with a centralized authority; and
   based on the decrypted second data, perform operations consistent with at least one of the rules, the operations involving the tracked asset,
   wherein the rules are established by the centralized authority, the centralized authority is associated with the tracked asset, and the at least one of the rules that exhibits a causal relationship with the event.

2. The apparatus of claim 1, wherein the at least one processor is further configured to load the at least one element of the distributed ledger from the memory.

3. The apparatus of claim 1, wherein the rules are established by the centralized authority, the centralized authority is associated with the tracked asset, and the at least one of the rules that exhibits a causal relationship with the event.

4. The apparatus of claim 2, wherein the at least one processor is further configured to:
   generate third data comprising at least one of (i) an additional rule or (ii) a modification to one or more of the rules identified within the decrypted second data;
   encrypt the third data using the master cryptographic key; and
   transmit, via the communications unit, the encrypted third data to at least one computing system, the at least one computing system being configured to perform operations that record the encrypted third data into an additional element of the distributed ledger.

5. The apparatus of claim 4, wherein the at least one processor is further configured to:
   receive, via the communications unit, input data generated by a device associated with the tracked asset; and
   based on the received input data, perform operations that generate the additional rule or modify the one or more of the rules.

6. The apparatus of claim 1, wherein the at least one processor is further configured to:
   generate third data that includes a modification to at least a portion of the decrypted first data;
   encrypt the third data using the private cryptographic key; and
   transmit, via the communications unit, the encrypted third data to at least one computing system, the at least one computing system being configured to perform operations that record the encrypted third data into an additional element of the distributed ledger.

7. The apparatus of claim 1, wherein the at least one element of the distributed ledger comprises a genesis block of the distributed ledger.

8. The apparatus of claim 1, wherein the at least one processor is further configured to:
   generate the master cryptographic key associated with the centralized authority;
   store the generated master cryptographic key in a portion of a secure data repository; and
   establish at least one access permission for the stored master cryptographic key, the at least one established access permission preventing a device of associated with the tracked asset from accessing the stored master cryptographic key.

9. The apparatus of claim 1, wherein the at least one processor is further configured to:
   generate the private cryptographic key associated with the tracked asset; and
   transmit, via the communications unit and through a programmatic interface, the private cryptographic key to a device associated with the tracked asset.

10. The apparatus of claim 1, wherein:
    the at least one processor is further configured to:
    detect an occurrence of the event involving the tracked asset; and
    identify, based on the decrypted second data, the at least one of the plurality of rules that exhibits the causal relationship with the event; and
    the at least one identified rule specifies the performed operations; and
    the performed operations involve the tracked asset.

11. A computer-implemented method, comprising:
- by at least one processor, obtaining first data from at least one element of a distributed ledger, and decrypting the first data using a private cryptographic key associated with an asset tracked by the distributed ledger;
- by the at least one processor, and when an event involving the tracked asset corresponds to a triggering event identified within the decrypted first data, obtaining second data that identifies a plurality of rules from the at least one element of the distributed ledger, and decrypting the second data using a master cryptographic key associated with a centralized authority; and
- based on the decrypted second data, performing, by the at least one processor, operations consistent with at least one of the rules.

12. The computer-implemented method of claim 11, wherein the rules are established by the centralized authority, the centralized authority is associated with the tracked asset, and the at least one of the rules that exhibits a causal relationship with the event.

13. The computer-implemented method of claim 11, further comprising:
- generating, by the at least one processor, third data comprising at least one of (i) an additional rule or (ii) a modification to one or more of the rules identified within the decrypted second data;
- encrypting, by the at least one processor, the third data using the master cryptographic key; and
- transmitting, by the at least one processor, the encrypted third data to at least one computing system, the at least one computing system being configured to perform operations that record the encrypted third data into an additional element of the distributed ledger.

14. The computer-implemented method of claim 13, further comprising:
- receiving, by the at least one processor, input data generated by a device associated with the tracked asset; and
- based on the received input data, performing, by the at least one processor, operations that generate the additional rule or modify the one or more of the rules.

15. The computer-implemented method of claim 11, further comprising:
- generating, by the at least one processor, third data that includes a modification to at least a portion of the decrypted first data;
- encrypting, by the at least one processor, the third data using the private cryptographic key; and
- transmitting, by the at least one processor, the encrypted third data to at least one computing system, the at least one computing system being configured to perform operations that record the encrypted third data into an additional element of the distributed ledger.

16. The computer-implemented method of claim 11, wherein the at least one element of the distributed ledger comprises a genesis block of the distributed ledger.

17. The computer-implemented method of claim 11, further comprising:
- generating the master cryptographic key by the at least one processor;
- storing, by the at least one processor, the generated master cryptographic key in a portion of a secure data repository; and
- establishing, by the at least one processor, at least one access permission for the stored master cryptographic key, the at least one established access permission preventing a device of associated with the tracked asset from accessing the stored master cryptographic key.

18. The computer-implemented method of claim 11, further comprising:
- generating, by the at least one processor, the private cryptographic key associated with the tracked asset; and
- transmitting, by the at least one processor, and through a programmatic interface, the private cryptographic key to a device associated with the tracked asset.

19. The computer-implemented method of claim 11, wherein the method further comprises:
- detecting, by the at least one processor, an occurrence of the event involving the tracked asset; and
- based on the decrypted second data, and, by the at least one processor, identifying the at least one of the plurality of rules that exhibits the causal relationship with the event;
- the at least one identified rule specifies the performed operations; and
- the performed operations involve the tracked asset.

20. A tangible, non-transitory computer-readable medium storing instructions that, when executed by at least one processor, perform a method comprising:
- obtaining first data from at least one element of a distributed ledger, and decrypting the first data using a private cryptographic key associated with an asset tracked by the distributed ledger;
- when an event involving the tracked asset corresponds to a triggering event identified within the decrypted first data, obtaining second data that identifies a plurality of rules from the at least one element of the distributed ledger, and decrypting the second data using a master cryptographic key associated with a centralized authority; and
- based on the decrypted second data, performing operations consistent with at least one of the rules.

* * * * *